(12) United States Patent
Simonson et al.

(10) Patent No.: US 7,929,475 B2
(45) Date of Patent: *Apr. 19, 2011

(54) SYSTEM AND METHOD FOR MULTICAST COMMUNICATIONS USING REAL TIME TRANSPORT PROTOCOL (RTP)

(75) Inventors: Dana Simonson, Owatonna, MN (US); John Livdahl, Waseca, MN (US); Rory A. Smith, Waseca, MN (US)

(73) Assignee: E. F. Johnson Company, Waseca, MN (US)

( * ) Notice: Subject to any disclaimer, the term of this patent is extended or adjusted under 35 U.S.C. 154(b) by 675 days.

This patent is subject to a terminal disclaimer.

(21) Appl. No.: 11/743,031

(22) Filed: May 1, 2007

(65) Prior Publication Data

US 2007/0242670 A1    Oct. 18, 2007

Related U.S. Application Data

(63) Continuation of application No. 09/924,956, filed on Aug. 8, 2001, now Pat. No. 7,221,660.

(60) Provisional application No. 60/223,682, filed on Aug. 8, 2000.

(51) Int. Cl.
*H04H 20/71* (2008.01)
*H04L 12/56* (2006.01)
*H04J 3/26* (2006.01)

(52) U.S. Cl. .................... 370/312; 370/390; 370/432

(58) Field of Classification Search .................. 370/312, 370/349, 389–390, 392–393, 432, 474–475
See application file for complete search history.

(56) References Cited

U.S. PATENT DOCUMENTS

| | | | |
|---|---|---|---|
| 5,696,763 A | 12/1997 | Gang, Jr. | |
| 5,806,002 A | 9/1998 | Wiatrowski et al. | |
| 5,910,946 A | 6/1999 | Csapo | |
| 5,956,648 A | 9/1999 | Brennan et al. | |
| 6,078,954 A | 6/2000 | Lakey et al. | |
| 6,141,347 A | 10/2000 | Shaughnessy et al. | |
| 6,141,533 A | 10/2000 | Wilson et al. | |
| 6,304,574 B1 * | 10/2001 | Schoo et al. | 370/401 |
| 6,456,594 B1 | 9/2002 | Kaplan et al. | |
| 6,519,472 B1 | 2/2003 | Brennan et al. | |
| 6,618,397 B1 * | 9/2003 | Huang | 370/474 |

(Continued)

FOREIGN PATENT DOCUMENTS

EP        0951198        10/1999

(Continued)

OTHER PUBLICATIONS

Schulzrinne et al., "RTP: A Transport Protocol for Real-Time Applications", IETF RFC 1889, (1996), pp. 1-75.*

(Continued)

*Primary Examiner* — Tri H Phan
(74) *Attorney, Agent, or Firm* — Schwegman Lundberg & Woessner, P.A.

(57) ABSTRACT

An Internet protocol (IP) packet switching communication system using real time transport protocol (RTP). Control packets map group identification codes to a multicast address on a network. Control packets are distributed on the network using simple object access protocol (SOAP) messages with extensible markup language (XML) payloads. Mapping may include dynamic or static functions. Multicast address data is distributed among routers. A message from a caller is multicast by the routers, based on the multicast address, to one or more destinations.

13 Claims, 17 Drawing Sheets

U.S. PATENT DOCUMENTS

| | | | |
|---|---|---|---|
| 6,647,020 B1 | 11/2003 | Maher et al. | |
| 6,771,644 B1* | 8/2004 | Brassil et al. | 370/390 |
| 6,832,239 B1 | 12/2004 | Kraft et al. | |
| 7,221,660 B1* | 5/2007 | Simonson et al. | 370/312 |
| 7,450,560 B1* | 11/2008 | Grabelsky et al. | 370/352 |
| 7,483,532 B2* | 1/2009 | Alkove et al. | 380/37 |
| 2002/0023165 A1* | 2/2002 | Lahr | 709/231 |
| 2002/0093948 A1 | 7/2002 | Dertz et al. | |

FOREIGN PATENT DOCUMENTS

| | | |
|---|---|---|
| JP | 2000032007 | 1/2000 |
| JP | 2001024703 | 1/2001 |

OTHER PUBLICATIONS

"Information technology—Telecommunications and information exchange between systems—High-level data link control (HDLC) procedures—Elements of procedures pp. 1-45, (1991", *International Standard—ISO/IEC 4335*, (1991),pp. 1-45.

"Information technology—Telecommunications and information exchange between systems—High-level data link control (HDLC) procedures—Elements of procedures. Amendment 4: Multi-selective reject option", *International Standard—ISO/IEC 4335*, (1991),pp. 1-3.

"Interface Between Data Terminal Equipment and Data Circuit-Terminating Equipment Employing Serial Binary Data Interchange", *EIA Standard-232-D, Revision of EIA-232-C*, (Jan. 1987),pp. 1-46.

"International technology—Telecommunications and information exchange between systems—High-level data link control (HDLC) procedures—Frame structure", *International Standard, ISO/IEC 3309*, (1993),pp. 1-8.

"Internet Protocol", *IETF RFC 791*, (1981),pp. 1-37.

"Part 3: Carrier sense multiple access with collision detection (CSMA/CD) access method and physical layer specifications", *IEEE Standard for Information technology 802.3*, (2000),pp. 1-1515.

"Project 25 FDMA Common Air Interface New Technology Standards Project Digital Radio Technical Standards", *ANSI/TIA/EIA-102.BAAA*, (1998),pp. 1-94.

"Telecommunications and information exchange between systems-Local and metropolitaqn area networks-Specific requirements, Part 2: Logical Link Control", *IEEE Standard for Information technology, ANSI/IEEE Std. 802.2*, (1998),pp. 1-239.

"TIA/EIA Telecommunications Systems Bulletin, APCO Project 25, System and Standards Definition", *TSB102-A (Revision of TSB102)*, (1995),pp. 1-74, A-1-C-12.

"Transmission Control Protocol", *RFC 793, DARPA Internet Program Protocol Specification*, (1981),pp. 1-46.

"User Datagram Protocol", *RFC 768*, (1980),pp. 1-3.

Schulzrinne, et al., "RTP: A Transport Protocol for Real-Time Applications", *IETF RFC 1889*, (1996),pp. 1-75.

* cited by examiner

GROUP VOICE CALL

INTER-SYSTEM CALLS

UNADDRESSED VOICE CALL SEQUENCE

PREPROGRAMMED DATA MESSAGE SEQUENCE

VOICE TELEPHONE INTERCONNECT - EXPLICIT DIALING

VOICE TELEPHONE INTERCONNECT - IMPLICIT DIALING

VOICE TELEPHONE INTERCONNECT - ROTS ORIGINATED

RADIO MONITORING UNIT

DISCRETE LISTENING CALL SEQUENCE

SILENT EMERGENCY CALL SEQUENCE

SYSTEM AND METHOD FOR MULTICAST COMMUNICATIONS USING REAL TIME TRANSPORT PROTOCOL (RTP)

RELATED APPLICATIONS

This application is a Continuation of U.S. application Ser. No. 09/924,956, filed on Aug. 8, 2001 now U.S. Pat. No. 7,221,660, which claims the benefit under 35 U.S.C. §119(e) of U.S. Provisional Application No. 60/223,682, filed Aug. 8, 2000, which applications are incorporated herein by reference.

TECHNICAL FIELD

The present subject matter relates, in general, to a system and method for multicast communications, and in particular, to a system and method for multicasting radio traffic using real time transport protocol (RTP) packets transmitted using Internet protocol (IP).

BACKGROUND

Among the biggest users of land mobile two way radio systems are the members of the Association of Public-Safety Communications Officials-International, Inc. (APCO). APCO includes state and local government employees involved in the management, design, and operation of police, fire, emergency medical, local government, highway maintenance, forestry conservation, disaster relief and other public safety communications systems.

Land mobile two way radio systems include analog communication systems and digital communication systems. In addition, radio systems may be described as conventional or trunked systems, each having a wide variety of different standards or protocols, many of which operate using manufacturer specific proprietary protocols.

This varied landscape of radio systems has created problems that have been identified by APCO and other radio users and system administrators. For example, local emergency medical service providers may encounter radio communication problems when faced with multiple emergency situations. Multiple emergencies occurring at geographically different locations of a city may lead to confusion and unnecessary delay which can result in life-threatening consequences for victims as well as responders. In addition, major natural disasters such as hurricanes, earthquakes, and floods are typically handled by several different public safety agencies where the ability to communicate between agencies is a necessity. Using current two way radio technology, responding rescue personnel from federal, state, and local public safety agencies may discover that coordinating their rescue efforts is difficult because the radios from the different agencies each may use different frequencies and signaling techniques. It has been reported that some on-scene commanders have been forced to borrow radios from one another to coordinate their emergency crew activities. In some cases, the radio systems are unable to communicate with each other.

APCO, with support from the U.S. Telecommunications Industry Association (TIA), has set forth Project 25 (P25) to address the interoperability shortcomings of land mobile two way radio systems. Radio equipment manufacturers have been instrumental in developing the standards adopted by the P25 steering committee.

What is needed is a system and method that meets the interoperability standards of APCO P25, and yet allows a caller to quickly and reliably establish a multicast group, communicate a radio message to the selected group, and then allow those same recipients to further establish and communicate in yet other multicast groups.

SUMMARY

One skilled in the art will readily recognize that the embodiments described addresses these problems and many more not mentioned expressly herein.

The present system includes a software-based packet switch that provides real time transport protocol (RTP) multicasting over Internet protocol (IP) for two way radio systems. The system enables voice over IP transmissions using packet switching technology that allows bandwidth sharing rather than using a dedicated link bandwidth associated with circuit switching. The IP transmissions may be communicated using a local area network (LAN), such as an Ethernet network, or a wide area network (WAN) such as the Internet. In this manner, it is believed that voice and data transmissions can be integrated and efficiently communicated.

The present system enables multicasting of dispatch calls using talk group (TG) identification numbers (TGIDs). In one embodiment, a TGID is mapped to a multicast address and IP routers coupled to the communication network execute the packet switching function. In one embodiment, the packets are communicated from one source to multiple destinations as determined by the TGID of the receivers. It is believed that the present system is beneficial over circuit switched systems because of the reduced bandwidth requirements. A destination may indicate an interest in receiving communications from a particular talk group by executing a registration process. In one embodiment, the registration process includes communicating with a regional or site controller.

The present system provides a method for mapping a talk group to a multicast address. Mapping can be statically determined, mathematically determined, or dynamically determined. It is believed that a priori knowledge of multicast address allows rapid routing of calls with little or no setup delay.

One embodiment of the present system operates using RTP for dispatch. RTP provides, inter alia, timing and sequence information used to reconstruct a voice stream. RTP tolerates lost packets. One embodiment of the present system operates using real time control protocol (RTCP). RTCP, designed to work in conjunction with RTP, provides quality of service information to the sender and the receiver. With quality reports provided using RTCP, it is believed that the sender and receiver may be able to adjust operating parameters to optimize efficiency under varying conditions.

One embodiment of the present system includes the use of dispatch radio voice RTP profile (DRVRP) control protocol messages. In one embodiment, DRVRP includes a set of formats that enables the exchange of call control information between control processors. DRVRP control protocol messages are believed to be independent of over the air (OTA) protocol. In addition, it is believed that DRVRP allows interoperability of equipment and systems from different manufacturers as well as cross-banding. Cross-banding includes the ability to receive a communication on one channel and transmit the same communication on another channel.

One embodiment of the present system includes the use of a repeater as an IP router. The repeater receives IP packets and routes them to the radio interface. In one embodiment, the IP frames are encapsulated into the OTA framing. In one embodiment, the repeaters, or routers, provide address translation. As used herein, a router may include, in general, a packet switch, and in particular, a packet switch configured to communicate multicast messages.

One embodiment of the present system includes the use of a repeater as an IP voice gateway. The repeater receives IP voice packets and repackages them as an OTA packet.

One embodiment of the present system includes a virtual circuit fibre (VCF). VCF allows the communication system to establish and allocate virtual connections using software. VCF enables multicast group trunking bypassing the multicast registration limitations imposed by present operating systems (such as for example, Windows 98 or Windows 2000), network routers and network switches.

One embodiment of the present system includes the use of an extensible markup language (XML) in a radio system. XML allows abstract representation of data used by a radio system and allows standards based interoperability independent of manufacturer protocols. XML style sheets provide mapping to presentation of data in a standard web browser, such as Netscape Navigator or Microsoft Internet Explorer.

In one embodiment of the present system, simple object access protocol (SOAP) and XML provide the technology to implement a distributed radio switching system. SOAP, in conjunction with XML distributes the workload between the individual components of the network and expedites computing processes by harnessing the power of multiple servers. The switching system may also include load balancers or other equipment developed for web servers. In one embodiment, the load balancers include commercially available off the shelf hardware and software.

By way of example, the present system permits communications between very high frequency (VHF) portable units and base stations and 800 MHz portable and base stations, as well as with computer, or console, applications. The VHF or 800 MHz units may transmit or receive P25 messages using 9600 bps common air interface (CAI). A VHF or 800 MHz unit may communicate with a personal computer (PC) platform with a Windows operating system (such as for example, and not by way of limitation, Windows NT or Windows 2000. The console application may receive transmissions, including store radio data until a link control word (LCW), translate talk group identification (TGID) number to a multicast address, and IMBE packets to a multicast address. The console application may also translate a multicast address to TGID. In one embodiment, a VHF or 800 MHz base station includes a built-in Ethernet Media Access Controllers (MAC) and performs TGID-multicast address translation. In one embodiment, the console application, when receiving, provides packetized IMBE data decoding (executed on the PC), reconstructs audio streamed to a sound card and sums multiple audio streams, and when transmitting, encodes microphone audio to IMBE, (executed on the PC), and routes IMBE packets to the network as IP packets, and also provides an Ethernet hub. In one embodiment, the console application provides multiple format voice processing, including analog and other interoperability modes. The IMBE software may also provide digital signal processing (DSP) co-processing to allow simultaneous call handling.

This summary is intended to provide a brief overview of some of the embodiments of the present system, and is not intended in an exhaustive or exclusive sense and the scope of the inventions is to be determined by the attached claims and their equivalents.

DETAILED DESCRIPTION

In the following detailed description, reference is made to the accompanying drawings which form a part hereof and in which is shown by way of illustration specific embodiments in which the invention may be practiced. These embodiments are described in sufficient detail to enable those skilled in the art to practice and use the invention, and it is to be understood that other embodiments may be utilized and that electrical, programmatic, and structural changes may be made without departing from the spirit and scope of the present invention. Trademarks and service marks are the respective property of their owners. The following detailed description is, therefore, not to be taken in a limiting sense and the scope of the present invention is defined by the appended claims and their equivalents.

The following documents are incorporated herein by reference, as though set forth in their entirety:
a) TIA TSB 102-A: Project 25 System and Standards Definition, TIA TSB-102-A.
b) ISO 3309: Information Processing Systems—Data Communication—High Level Data Link Control Procedures—Frame Structure.

c) ISO 4335: Information Processing Systems—Data Communication—High Level Data Link Control Procedures—Elements of Procedures.
d) TIA/EIA-232 Interface Between Data Terminal Equipment and Data Circuit Terminating Equipment Employing Serial Binary Data Interchange, October 1997, Revision F.
e) ANSITIA/EIA 102.BAAA: APCO Project 25 Common Air Interface.
f) IEEE 802.3 Ethernet 10-base-T
g) IEEE 802.2 Ethernet protocol
h) IETF RFC791 Internet Protocol
i) IETF RFC768 User Datagram Protocol
j) IETF RFC793 Transmission Control Protocol
k) IETF RFC 1889: A Transport Protocol for Real-Time Applications As used herein, the fixed station interface (FSI) provides for transmission of signals between a fixed station (FS) and a radio frequency sub-system (RFSS) where the FS and RFSS are operating in conventional analog mode, conventional digital mode and trunked digital mode. The FSI allows fixed stations of any manufacturer to be interfaced to the RFSS of another manufacturer.

Figure 1:
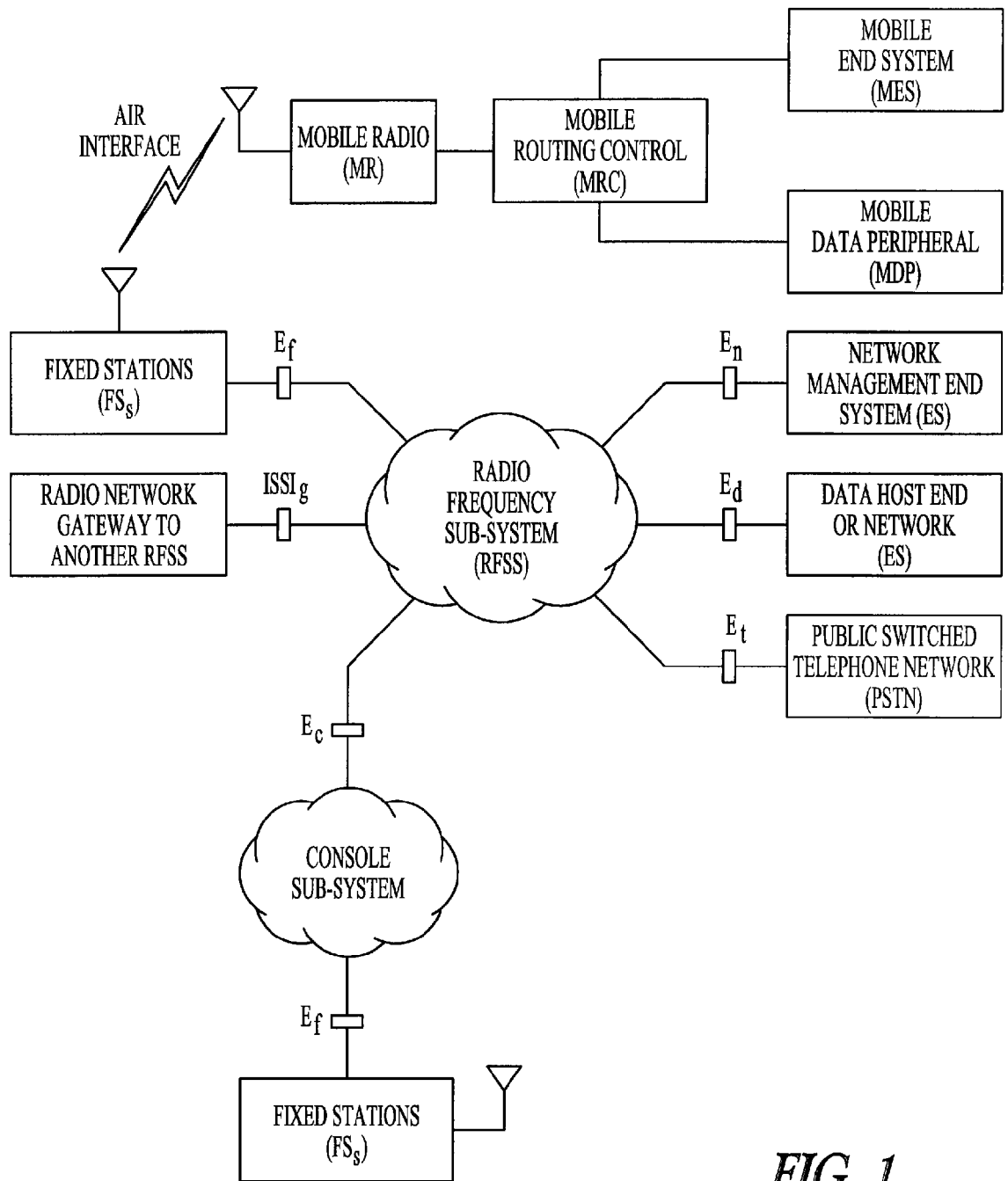
FIG. 1 illustrates a block diagram showing selected elements of a radio communication system.

The present system receives radio data, packetizes the data, and transmits the data using IP multicast, across to routers with the router doing the switching. Thus, eliminating the traditional circuit switch. The IP may be carried by 10baseT Ethernet, 100baseT Ethernet, Gigabit Ethernet or other physical transport layers. Thus, the present system utilizes the multicast functionality of IP. FIG. 1 illustrates a diagram of a communication system.

Traditionally, packet communication proceeds using IP from point-to-point. In radio communications, packets are transferred from a base station or repeater, to a server. The packets are transferred on a direct link. Packets from the base station are transferred to the server and the server makes the decisions as to further routing of the packets. A central server receives the transmitted packet, determines the routing for the packet and sends the packet out on the network. Thus, when one caller transmits a packet to four destinations, the server transmits four packets and uses a bandwidth that is four times greater than if there were to be one destination.

In multicasting, the routers themselves distribute the packets for the call, thus reducing traffic on the network and thereby reducing the bandwidth required of the network. A central server determines the routing of the packets, that is, which multicast address are the destinations located on, and then the base station sends the information to the routers and the routers, through stored routing tables for the multicast setup, allocates the data and sends the information out to the destinations when it is needed. In one embodiment, the routing table is stored locally at each router site.

Thus, in one embodiment, the present system provides a multicast communication switch using IP routers as the switching fabric. Voice and data radio traffic are communicated within one or more talk groups using IP packets. The talk group, and thus the multicast address, may include two or more members, each having a radio, base station, repeater, or other communication device.

Management of the limited number of multicast addresses is provided by a virtual circuit fiber (VCF). Each router can accommodate a limited number of multicast addresses and the VCF provides management of the limited resources.

The multicast addresses are trunked using a communication switch. It is believed that the present system may be suitable for a fixed station interface, an inter-system interface (ISSI) and a systems console interface. In particular, the present system may find application with a variety of interfaces and systems within the APCO P25 initiative.

One embodiment of the present system incorporates real time transport protocol (RTP) which is an IP-based protocol providing support for the transport of real-time data such as video and audio streams. Services provided by RTP include time reconstruction, loss detection, security and content identification. RTP is suitable for multicast of real-time data, and it can be also used in unicast. RTP is designed to work in conjunction with the auxiliary control protocol RTCP to get feedback on quality of data transmission and information about participants in the on-going session. In one embodiment, RTP operates independently of the underlying transport and network layers, according to the OSI reference model of TCP/IP.

One embodiment of the present system includes VCFs, using multicast and RTP. Examples of particular message types are presented below. The message formats may differ from those presented, however, in one embodiment, the formats are as presented.

Different types of routers are operable with the present system. In the present system, the routers use headers and a forwarding table to determine where packets go, and they use Internet Group Management Protocol (IGMP) to communicate with each other and configure a route between any two hosts.

The present system allows for different types of protocol independent multicast (PIM) formats to be used, the selection of which may be determined by system efficiency, capacity and other factors. Examples of PIMs include dense mode, sparse mode, and BiDir mode. Dense mode refers to a scheme wherein the initial assumption is that all participants are interested in receiving every communication. A multicast message is burst to all recipients and those recipients that are not interested are "pruned" away. In sparse mode, the message is sent to a rendezvous point which then forwards the message to only those who are registered as being interested. In BiDir mode, a bidirectional tree structure is established and the multicast message is turned around at each of the shortest branches of the tree structure. Variations and combinations of these, and other PIM formats are also possible.

In one embodiment of the present system, a control computer is coupled to each router. Each repeater is coupled to a router. Assume a repeater, here a fixed station, keys up. The first time the fixed station keys up, it will send a control message to the control computer. The message will be returned specifying a multicast address to be used. The fixed station then can proceed to send packets to the router connected to the fixed station. The router will have received a switching information, based on registered repeaters in the system, and the router will transfer the packets using the router ports. Thus, the routers perform the splitting of the packets in accordance with control messages received and distributed by the control computer. In this manner, there is no central point for receiving the information packet, but rather, the packets are switched by the distributed routers in accordance with switching instructions received from the control computer. Thus, the present system is a distributed system where each individual router implements the multicast routing function and the switching is performed by the routers in the system based on which router is registered for that multicast address.

The individual routers receive the information as to membership in the multicast group using IP standards. When computers or radios register to receive calls in the group, a unique message is transmitted to the router. The router also forwards the message to other routers, thus distributing the switching information throughout the system.

In operation, when a caller comes on line initially, a registration process is executed that results in a packet transmitted through the control computer (server). The packet identifies the source and announces arrival of the caller. The caller may be identified as part of a wide area group and each time the caller keys up, it may be the case that the caller is to be assigned to talk to callers 2 and 3. Thus, caller 1 will have triggered a message back to each station indicating that caller 1 is registered and present. This collection of callers is called a VCF. Each caller is registered on a virtual address and each sends a registration message. In one embodiment, the message is an IGMP message. The IGMP message indicates the multicast address to be used. The routers, using router setup standards, will set up the desired multicast and will send out messages to each other to register on that group. IGMP may be used to maintain host group membership on a local subnet.

The distribution of the multicast message may proceed according to various predetermined modes, such as dense PIM, sparse PIM, BiDIR PIM or other modes. Following the initial setup, the next time the caller keys up and sends call data in, the data is sent on that multicast address to the router and the router knows in which direction to pass the message to reach registered receivers.

The control packets reach the server and the server communicates back to each of the different routers the data needed for the multicast. The endpoints may include repeaters or fixed stations. The control packets may specify which routers are to be registered or de-registered, as the case may be. The endpoints will communicate back to the control computer to indicate an interest in participating in particular multicast addresses.

At the radio level, the multicast address may be determined by a talk group specification. Having selected a talk group for broadcasting, the radio is unaware that the call is radio-to-radio direct or talking to a base station and going across a wide area network. When the radio is talking to a particular talk group, all participants on that talk group will be receiving.

The control computer, or server, supplies data to the routers to enable each router to properly direct the radio traffic throughout the system. The radio traffic is directed throughout the system based on predetermined multicast groups. Each radio talk group is mapped to a multicast group. The VCFs correspond to particular multicast groups.

Thus, if a user with unique ID (UID) 3 enters the system and registers, and indicates that it is a member of talk group 4, and if the base station recognizes that other users also in talk group 4 are present, then, the base station will need to arrange to register for talk group 4. In this manner, if a wide area call for talk group 4 is received, then the base station will properly route the calls to the members of the talk group. Membership is indicated by information in the control packets.

The server receives the control packet which identifies the stations that need to receive the radio traffic. A command packet is distributed to each of the stations and the command packet instructs the station to listen for radio traffic. Each station then registers and the radio traffic is properly distributed according to IP standards.

In one embodiment, the server processes, for example, 10 packets of control data with each call. The packets of control data represent the control plane. This system permits servers to be mobile throughout the system since the radio traffic does not get distributed to a central server. Each server may also cache information for later use. Previously registered users need not consume any processing capacity since no decision needs to be made.

The moniker virtual circuit fiber (VCF) denotes the individual circuits within the system.

In the present system, various protocols may be utilized. For example, in one embodiment, IP packets are communicated using RTP (real time protocol).

Direct Mapping of Addresses

In one embodiment, each talk group is mapped, or assigned, to a unique multicast group. This approach may be limited by the memory or processing capacity of the server. Other mapping relationships may also be defined as explained below. In one embodiment, the routers determine the switching. In one embodiment, a control plane is in communication with a server which then establishes a plurality of virtual circuits.

The present system is compatible with a mixer embodiment wherein the voice and data packets are all transferred to a central computer for redistribution according to a multicast assignment.

Using RTP, the payload includes voice and data. Header information in the RTP packet indicates the type of payload, talk group membership, and other information. For example, the RTP packet may include IMBE vocoder data, PCM data or other data. In addition, the RTP packet may indicate talk group 5 as well include the data as to the decoding of the packet.

Digitized voice may be in the form of Improved Multi-Band Excitation (IMBE) data. The IMBE voice encoder-decoder (vocoder) listens to a sample of the audio input and only transmits certain characteristics that represent the sound. The receiver uses these basic characteristics to produce a synthetic equivalent of the input sound. IMBE digitized voice is optimized for human speech. In operation, the IMBE vocoder samples the microphone input every 20 milliseconds and produces 88 bits of encoded speech, or said another way, the vocoder produces speech characteristics at a rate of 4400 bits per second. Error correction adds another 2800 bps, and signaling overhead brings the total rate to 9600 bps.

In one embodiment, a server is not used and messages are routed according to a predetermined mapping of talk groups to repeaters. In this case, the message is transferred from repeater to repeater. For example, talk group 4 may be communicating using multicast group 7.

In one embodiment, each repeater is assigned to a virtual circuit using a static, or fixed, connection. In such a case, repeater B may be assigned to virtual circuit 5. Other repeaters also on virtual circuit 5 then can monitor the repeater B's conversations and repeater B will hear conversations from all other repeaters on the same virtual circuit. In this embodiment, a dynamic server is not required and each repeater operates as one station no matter where the repeaters are geographically located. This mode may eliminate the need for a control plane.

In one embodiment, a control packet having a predetermined format, provides information about the mapping of the talk groups to multicast addresses. The predetermined format may be any of several formats. In one embodiment, the format is referred to as simple object access protocol (SOAP). SOAP is carried on top of HTTP, which is carried on top of TCP, which is carried on top of IP. SOAP uses an extensible markup language (XML) fragment. This mode provides a dynamic message scheme using a control plane and traffic from the repeater gets assigned to one alias talk group.

In one embodiment, the RTP payload type can be changed dynamically, thus expanding the scope of the payload. For example, multiple voice packets may be encoded into a single RTP frame. In this manner, two or more codecs, or voice packets, may be encoded into one frame. In one embodiment, a subheader within the RTP frame identifies the types included. The subheader may provide identification information regarding the subpacket payload type, thus allowing mixing of different packet types in a frame. The frame may include low speed data, data and a voice inside of one frame.

In one embodiment, data is transmitted over the air and at 20 millisecond increments, each voice packet has a few bits of low speed data with it. One low speed data frame is received over every 9 packets of voice, and thus, one frame of data is received after every 180 milliseconds. The low speed data may be buffered and transmitted in intervals from the repeater or using a subheader, the frame can include both voice and low speed data in a single frame. In this manner, for example, two bits of low speed data may be sent with the voice in each frame or the entire packet may include low speed data. The use of subheaders within an RTP frame is sometimes referred to as complex RTP.

Mapping Schemes

Fixed Mapping

Traffic on one repeater may be mapped to one virtual circuit in which case, all traffic on the repeater is funneled to one virtual circuit. In one embodiment, the VCFs map talk group IDs to particular servers. In this manner, any communications within a particular group is automatically put on a particular virtual circuit.

Predefined Static Table

According to one embodiment, another static mode provides that the repeater puts traffic onto different circuits according to a predefined static table. Some of the traffic goes to the one spigot and some goes to another. For example, with two multicast addresses available, one embodiment may provide that TGID's 1, 3, and 5 are mapped to multicast address A and TGID's 2 and 4 are mapped to multicast address B. The predefined static table expresses the correlation between addresses and talk groups. For example, 10 talk groups may be mapped to the same multicast address. As another example, consider a radio network with talk groups 100 to 110 and talk groups 1000 to 1015 already set up in the radios. It may be desirable to have the multicast addresses grouped together, so in one embodiment, talk group 100 may be mapped to multicast address 1, TG 101 is mapped to multicast address 2, and TG 103 is mapped to multicast address 12.

Mathematical Mapping

In one embodiment, each talk group is mathematical mapped to a circuit. A one-to-one correspondence exists between TGIDs and multicast addresses. For example, talk group 12 may be assigned to an IP base address plus 12. In this manner, each talk group is mapped to a particular multicast address. Each talk group is associated with a unique multicast address.

Server Controlled Mapping

In one embodiment, a server dynamically controls resource allocation according to programmed priorities. Thus, depending on resource availability, system configuration, and other factors, server controlled mapping may result in a particular TGID mapping to a particular multicast address at one instant and the same particular TGID mapping to a different multicast address at a later instant.

Contents of the Control Plane

The contents of the control plane, according to one embodiment of the present system, is described below. In one embodiment, a control packet is transferred to the server.

Exemplary Operation

Consider the scenario where a radio keys up. The fixed station first recognizes that a call is starting on, for example, group 12 from a radio with UID 14. The fixed station then creates a SOAP packet based on this information and sends it to the server along with a question asking if the UID is authorized. Using the UID, the server determines if the radio is part of the server's system and also determines if the radio is authorized to use group 14. The server also verifies that group 14 is part of this wide area call, and then extends an ACK back to the radio that allows the call to proceed. Next, a configure VCF message is sent to the caller and to the other repeaters which have registered users.

In one embodiment, the initial transmission includes the UID, the talk group ID, as well as the network access code (NAC) or system ID. The phrase "talk group" is closely associated with P25, however, as used herein, talk group may also refer to a NAC or system ID. The NAC or system ID identifies the talk group in conventional systems. More precisely, conventional radios are all assigned to the same talk group, (for example, talk group 1) and by selecting different NACs, calls can be placed to different groups. As used herein, a communication group may include a talk group, a NAC or a system ID, or a call guard. A call guard is a term associated with conventional analog radio systems.

Pursuant to the P25 specification, the NAC is to match the system ID, however, not all manufacturers meet all elements of the specification. Using conventional radios, the P25 specification also allows the NAC to function like a Digital Call Guard.

In a trunked system, the NAC is a system ID that identifies the whole system in use. For example, the State of Minnesota may operate one system and the State of South Dakota may operate a second system and each can talk to the other across the inner system interface (ISSI). By way of further example, one communication system may be the police department in the city of Eden Prairie (with a unique NAC) and fire department in the city of Eden Prairie (also with a unique NAC) may be a separate system. In the case of the city of Eden Prairie, there are then two sets of equipment, operating as two separate systems, with the police and the fire department each having complete control over their equipment. Each system has unique UIDs and talk groups. Using the inner system interface, members of talk group 1 in the police department can communicate with members of talk group 1 in the fire department.

In a conventional system, the NAC appears in the first header over-the-air (OTA) followed by other information. Use of NAC codes to direct call traffic is one method of allowing conventional radios to be carried wide area.

The control packets may include a NAC, (network access code—also referred to as the system ID) and a talk group ID.

An individual voice call request may include the network number, WACN (network ID), the system ID which is the same thing as a NAC. Note that in trunking, what is referred to as a system ID is, in conventional radio, used as a NAC. The talk group ID may be included in the header of the radio communication also. Thus, the packet may include the system ID, the WAC ID and the UID of the radio that is keying up. In one embodiment, the UID arrives 180 milliseconds later at the time when the link control word (LCW) arrives.

Consider an interleaved message with voice. The header will be sent, followed by voice, followed by another 20 milliseconds of voice followed by a link control word, followed by a sequence of voice and control words.

As to the control plane, a registration process is executed which describes how users register with the system to express affiliation with a talk group. The controller uses this information to identify the location of different elements and what repeaters to tell to listen to the virtual circuit. The registration process is executed whenever a radio moves out of range of one site and into range of another site. When a mobile trunking radio is powered on, a roaming process is performed.

Multicasting is a means for limiting network traffic and as such, one embodiment of the present system includes static mappings suitable for use with conventional radios. In this manner, the control computer knows that, for example, talk group 1 is associated with 3 particular sites.

Consider the use of load balancers. When data is encoded in SOAP, the control plane messages may appear like web page requests. SOAP rides over HTTP so the server may receive what appears to be multiple web page requests and the server will respond by replying with another SOAP response. A load balancer installed in front of the server can support a server farm, for example, having a bank of 6 servers, and the load balancer then decides which server receives any particular request. Thus, many repeaters may be talking into that server farm and the load balancer would perceive that they were just serving web page requests.

In this manner, the load balancer moves traffic between different servers where each server has a unique IP address. Traffic is routed to the one IP address of the load balancer, and the load balancer farms it out to the different servers. The load balancer determines the content of the traffic and when a particular server is requested to do something, the load balancer assures that all future correspondence going along with that request are sent back to that same server. Thus, the load balancer keeps track of the conversation and makes sure that once the conversation starts from server 1 to repeater 1, the conversation remains on the same server until finished. In this manner, the load balancer monitors the progress of the transaction. In one embodiment, the present system uses a commercially available Secure Socket Layer (SSL) accelerator. In one embodiment, the SSL accelerator includes hardware or software and provides encryption and decryption. Encryption and decryption may be beneficial for control plane messages to prevent unauthorized access and snooping of the network.

One embodiment of present system employs commercial load balancers and commercially available servers and therefore, enjoys the advantage of lower cost. Furthermore, defined IP standards may be adapted for use in the present multicasting system, thus, the system may be embodied in software.

One embodiment of the present system employs a private local area network. One embodiment utilizes an Ethernet network. Other networks, including local area networks or wide area networks, are also contemplated, including token ring networks and the Internet. One possible advantage derived from using a local area network is the ability to control all the routers.

The present system is suitable for use in dispatch communications where a single person is talking or communicating with a group of people. In addition, the multicasting functions described herein may find application in direct communications where one person is talking or communicating with another single person.

In one embodiment, the present system may be used with the Internet. For example, suitable programming executing on a personal computer may be adapted for performing as a virtual radio using the present system. In one embodiment, a first personal computer, equipped with a microphone and speaker, allows bidirectional communications with another person accessing a second suitably equipped computer also equipped with a microphone and speaker. The first and second computers are coupled by a LAN or WAN. In one embodiment, the computer user can select different talk groups with which to multicast a message. In one embodiment, the multicast message is transmitted using the M-bone, in which case, communications may proceed over the Internet.

In one embodiment, the personal computer allows selection of a talk group with which to transmit a message. For example, one embodiment allows the operator to select a talk group associated with a particular fire truck and another talk group associated with a police department. In one embodiment, the computer simulates the functioning of a fixed station interface.

In one embodiment, the control plane messages are managed by a computer operable by a user. When a user selects a button, a message is transmitted to the server requesting a virtual address to talk to the police department. The server may reply and put the traffic on a police department address. Other consoles, computers, radios, or repeaters may be notified that there is an incoming call and include a message requesting that the other consoles, computers or radios become registered and listen on the address. The messaging is directed through the routers. In one embodiment, IP messaging clients are adapted to communicate using the multicasting described herein. In this manner, chat functions popular on the Internet, would allow a participant to multicast a message to multiple recipients in a single transmission. In addition, network environments wherein a message is sent to a predetermined group may find application using the present system. For example, using an e-mail function, a plurality of recipients can received the same message using the present system.

Other applications are also contemplated. For example, using the present system, a computer console user in Minnesota, coupled to the Internet by an ISP or other means, may correspond to a two way radio user in Canada or a cellular telephone in Texas (using, for example, a telephony gateway). In one embodiment, communications may be conducted wherever IP access is available.

In one embodiment, the present system operates using mathematical mapping. Upon addition of a new talk group, the computer console registers onto the system by sending an IGMP message on the new multicast address out to the router. The internal router, at a facility, then communicates with an Internet router and forwards the message to a destination or registered member of the talk group.

The present system permits establishment of an instantaneous multipoint-to-multipoint conversation. In this manner, a number of users may communicate in independent conversations and rapidly switch to a mode allowing one person to multicast a single message to many users.

Organizational Structure

Figure 2:
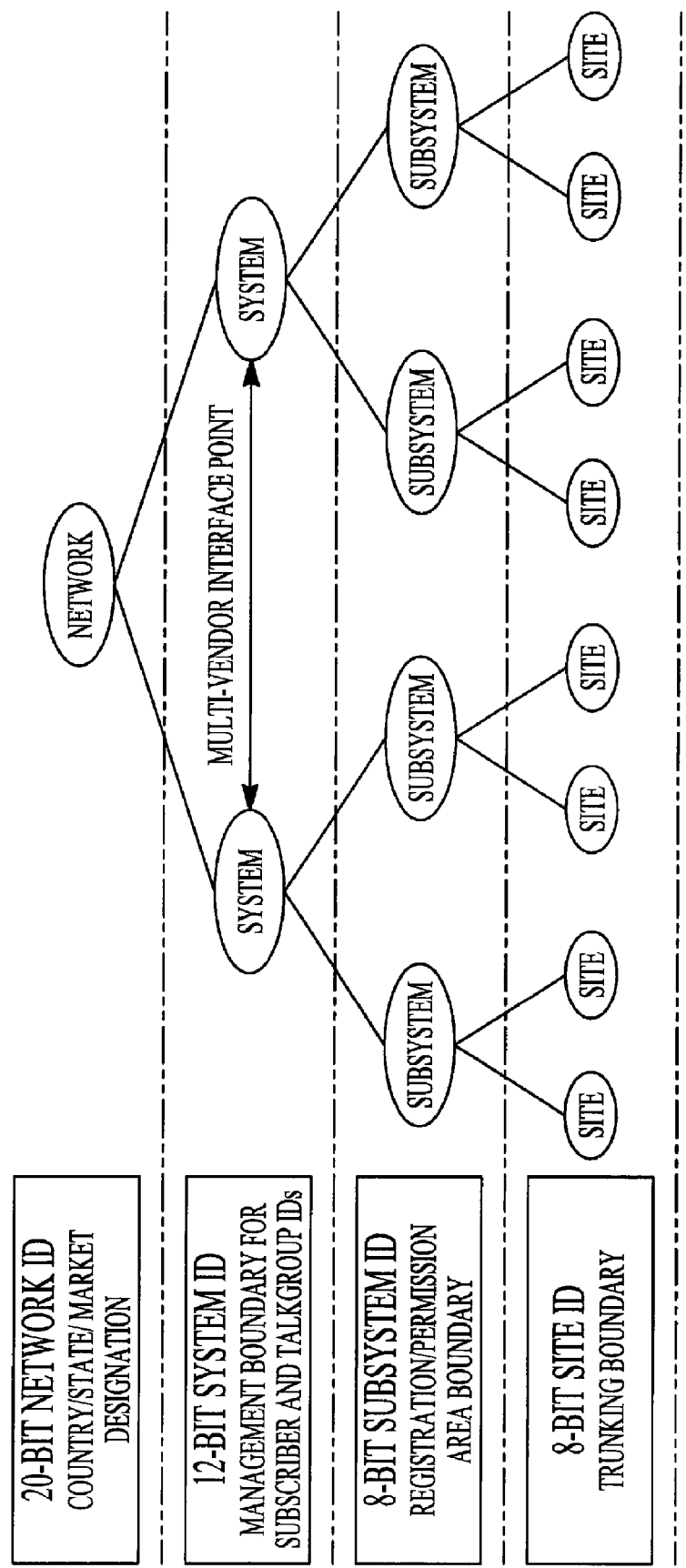
FIG. 2 illustrates the organizational structure within a radio communication system.

FIG. 2 illustrates an organizational structure according to one embodiment of the present system. The figure illustrates a network, such as, for example and not by way of limitation, an Ethernet for a particular agency or governmental unit. The network is identified by 20 bit code and may represent a county, state or market designation. As shown in the figure, the network includes two systems, each having a 12 bit system ID code. The systems may represent a management boundary for subscriber and talk group IDs. Also, the systems may be interfaced with each other by hardware and software from different vendors or manufacturers. The figure also illustrates that the systems may be further divided by subsystems, each herein identified by an 8 bit subsystem ID code. The subsystem may represent the boundary of a registration or permission area. Each subsystem may have a plurality of sites, each having an 8 bit site ID code. The sites may represent a trunking boundary.

The logical level breakdown provides, for example, that different municipalities may have a different network ID, and different states may have different network ID's and the FBI or something might have a system per state. Within each system may be multiple subsystems, and each subsystem may have one or more sites.

Console Application

Figure 3:
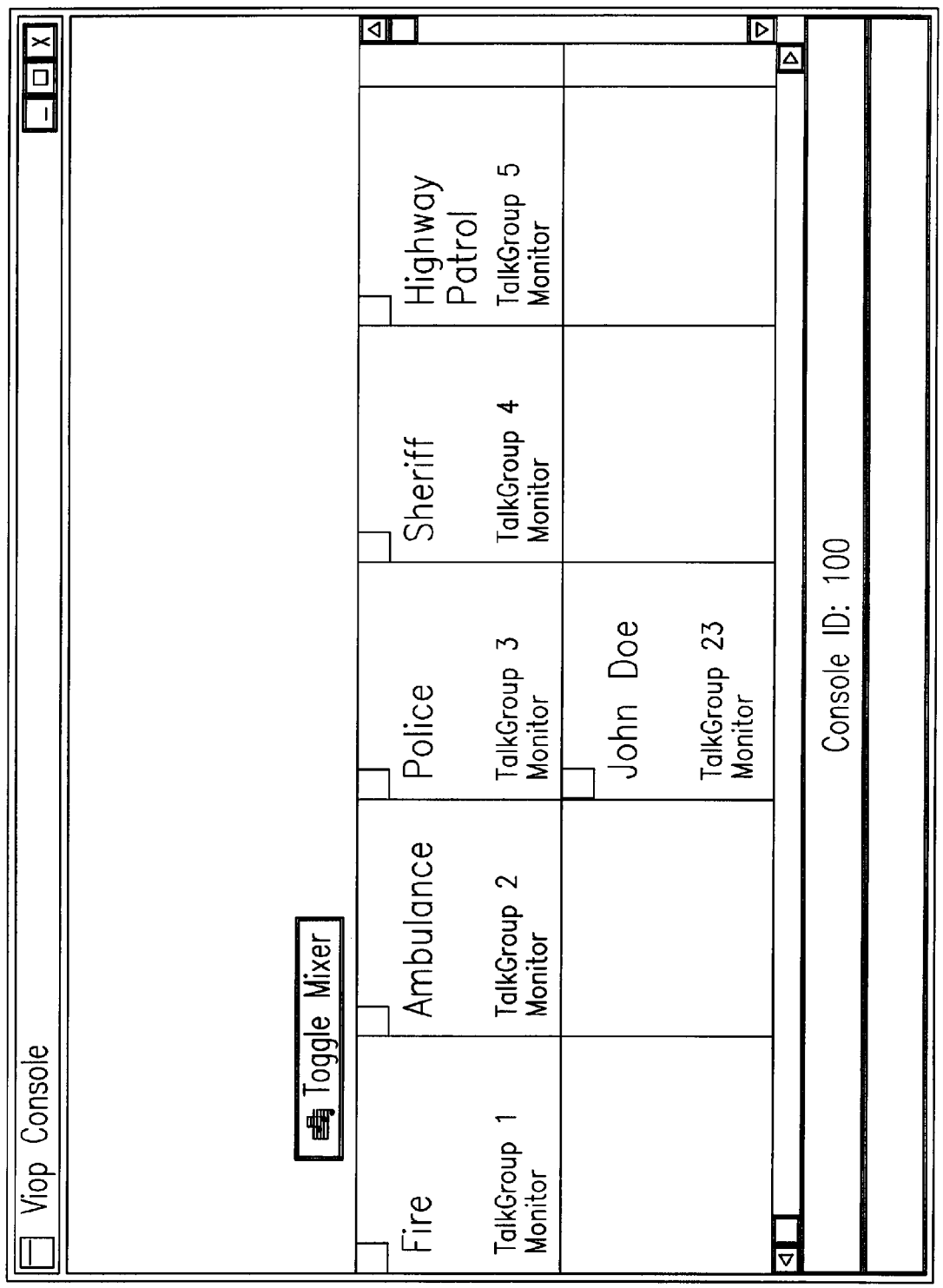
FIG. 3 illustrates a screen shot of a console application in accordance with the present subject matter.

In one embodiment, of the present system, a console or computer terminal provides two way communications between remote subscriber units either over a LAN or a WAN. For example, a computer equipped with a microphone, speaker or headphone, and suitable executable software may be coupled to the network. A screen shot of a computer monitor according to the present subject matter is illustrated in FIG. 3. In the figure, a plurality of user-selectable control buttons are presented. The figure illustrates that each control button is associated with a group or individual name and a unique talk group identification number. Thus, in one mode of operation, one or more of the talk groups may be selected for monitoring. Traffic on a monitored talk group is then played over the speaker or headphone coupled to the computer. In addition, the console user may selectively highlight, using a cursor or mouse, a particular group or individual name and, by using the coupled microphone, communicate a verbal message.

Operational Examples

A unique ID call (UID) call may be received from user 1 (U1) on system 1 (S1) calling to user 2 (U2) on system 2 (S2). The UID call may be placed with extended addressing. System 1 controller recognizes the call as destined to system 2, and thus contacts system 2 controller and negotiates for a common address to carry the call. The FS of S1 and the FS of S2 are notified by their respective controllers of the negotiated address and each registers for the multicast address. The FS of S1 sends a ready message to U1 and the call proceeds on the specified multicast address. On completion of the call, both FS of S1 and the FS of S2 notify their controllers of the call stats. The controllers then verify that each has completed the transaction and the negotiated address is released.

Assume a UID call from U1 on S2 to U2 also on S2. In this example, it is assumed that the user will have received a working UID. Alternately, the extended addressing mode may be used, but S2, having recognized that U1 has roamed into system S2, routes the call on the local address block.

Assume a UID call from U1 on S2 to U2 on S1. This call may proceed as described above relative to U1 on S1 calling U2 on S2 but with roamed user data.

Assume a group call from U1 on S1 to a group on S2. In this case, assume there is no extended addressing message. In one embodiment, an extended address mode is added and then the controller recognizes the address and contacts S2 to negotiate for an address.

Assume U2, on S1, makes a group call with no gatekeeper. Here, the FS of S1 recognizes that the NAC (network access code or system ID) from U2 is not a part of S1. When U2 sends a message to S1, S1 recognizes the system ID of S2 and contacts S2 to negotiate an address. S2 notifies all FSs on the S2 system which have users registered on the group to listen to the address. S1 notifies the FS of S1 to use the address and the call proceeds. In this mode, the FS includes a stored table of active foreign NACs and a talk group-to-address map for each.

Assume U2 on S1 makes a group call with a gatekeeper. When U2 affiliates, S1 notifies the gatekeeper that there is a user on S1 that needs access to S2. The gatekeeper negotiates with S2 for an address and registers for the local group address. When U2 keys up on a group, the gatekeeper will re-transmit that group to S2. This assumes that a talk group remains accessible even for roamed users. Thus, talk group 1 of S1 and talk group 1 of S2 become interconnected. This also assumes that talk groups may be programmed over the air. When a user roams into the system, the system checks authorizations and download channel mappings and accessible talk group lists. If these talk groups are defined for inter-system use, then the systems setup up the gateway to bridge the two talk groups. The user then acts as though it were a local radio.

IP protocol allows computer technology to provide the packet switching function. The IP protocol is communicated using a network. In one embodiment, the network includes an Ethernet network or other local area network. Ethernet provides a closed commendation network suitable for the present system. The private network may be a wide area network or the Internet. IP protocols are used for packet transporting and dispatching of two way radio traffic.

A private network may be preferable to the Internet for several reasons. For example, users may prefer to have complete control over their communication network and the Internet fails to provide assurances and reliability in communicating packets. In addition, some users may object to the Internet for fear of unauthorized intrusion and possible compromise.

The present system may be advantageous because it provides a distributed approach rather than a conventional, dedicated switch having a dedicated bandwidth. One embodiment of the present system employs a packet switch that allows intermingling of data and voice packets.

In one embodiment, the present system employs multicasting a packet stream using an Ethernet and multiple, individual receivers.

One embodiment of the present system utilizes RTP protocol for real time multicasting and RTCP for control information paired with the data layer of RTP. It is believed that RTP may be advantageous since it may function with minimal overhead burden for real time applications. RTP may increase the likelihood of on-time delivery of packets and sequencing of packets.

In the present system, a receiver communicates back to the router to report an interest in joining a talk group, and thus, in receiving multicast transmissions. The router recognizes registered users and sends packets accordingly. In multicasting, a single packet is conveyed to multiple destinations.

The present system allows multicasting using conventional and trunked radio systems. In the present system, a radio submits a multicast request rather than submitting a request to receive a communication. The present system may be compatible with APCO P25, LTR-Net, Multi-Net, Smart-Net, Smart-Zone, and others.

In one embodiment of the present system, a repeater is functioning as an IP router. The IP packet is sent into the repeater on a first interface and data is re-routed out on a second interface. In an ordinary router, data arrives via a network, such as an Ethernet network, and may be communicated out on an ATM or serial link. Thus, the present subject matter includes operating a repeater as a gateway.

By way of example, a repeater in the present system may operate by receiving data encoded in an IP packet, translating the packet into a signal for a CAI and transmitting the data over the air. In this manner, the repeater acts as a gateway for voice transmissions. In addition, the repeater may also operate as a router for handling data transmission. For example, a police officer may use a mobile radio coupled to a local printer for printing a traffic ticket. In this manner, the repeater acts as a data router.

Figure 4:
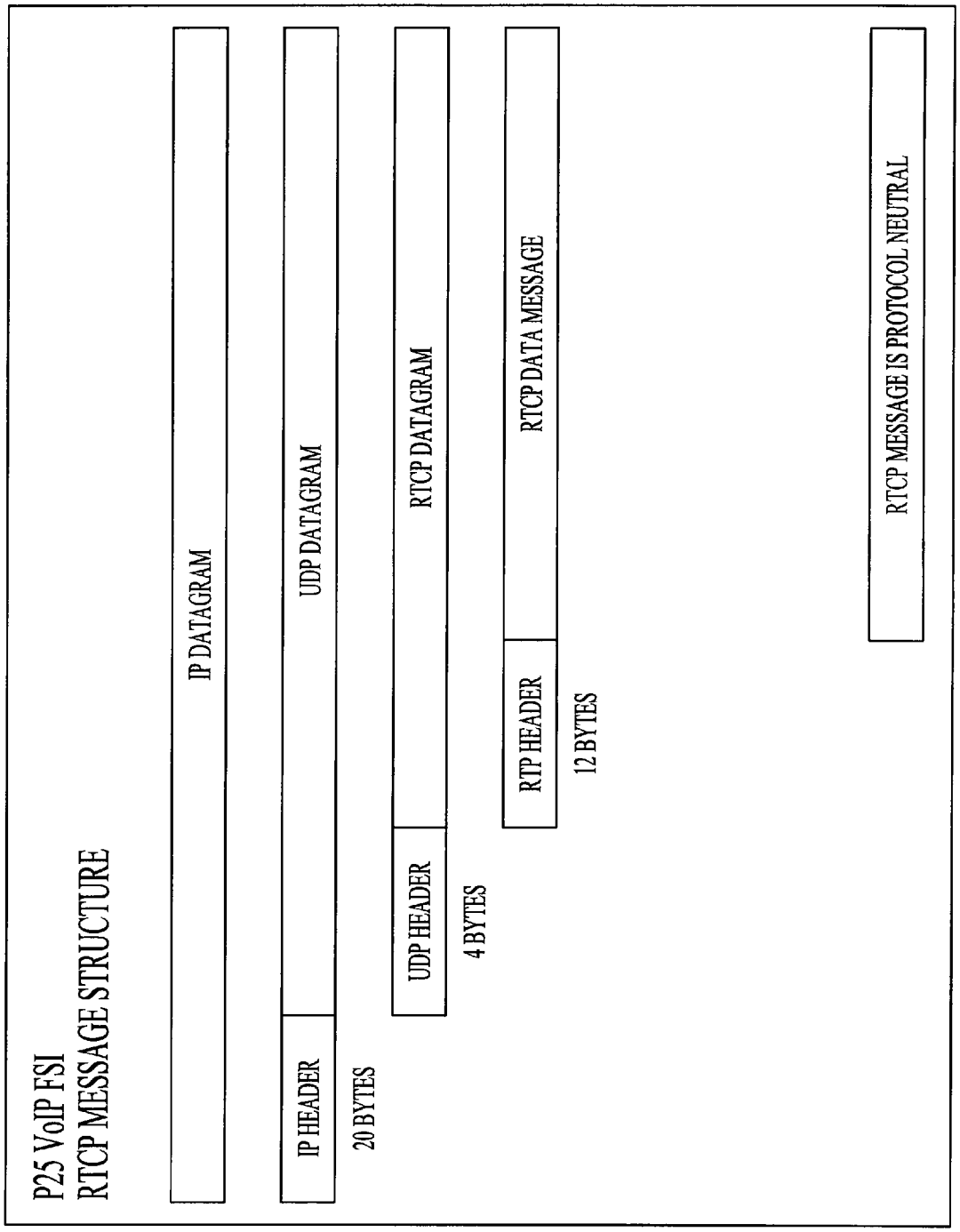
FIG. 4 illustrates a message structure in accordance with the present subject matter.
Figure 5:
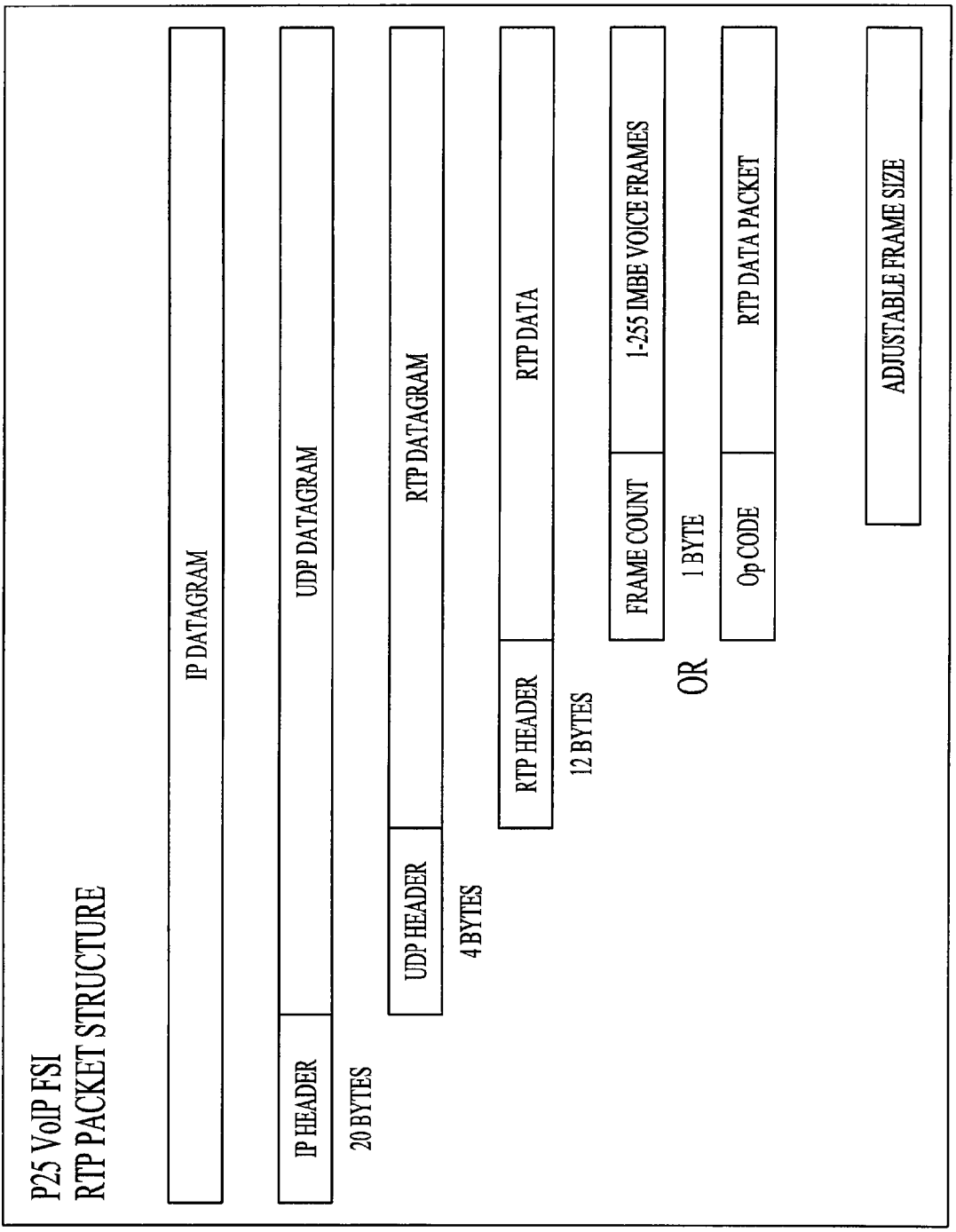
FIG. 5 illustrates a packet structure in accordance with the present subject matter.

In one embodiment, RTP provides assurances of timely delivery of a packet to a destination and sequencing of delivered packets. In addition, RTP may be augmented by a control protocol. In one embodiment, the control protocol is RTCP. The control protocol is employed to assure quality of service and for periodically providing sender and receiver reports to participants. Information provided by the control protocol includes data concerning the packet rate, number of lost packets and other such information. In one embodiment, the control protocol includes information concerning packet loss rate, packet transmission delay and delay jitter. The lower layer, or layers, of the IP stack provide error correction mechanisms. A sample RTCP message structure is illustrated in FIG. 4 and a sample RTP packet structure is illustrated in FIG. 5.

RTP provides monitored data delivery and is scalable to large multicast networks.

In one embodiment, the present system uses the lower layer of IP, rather than TCP, for the dedicated switch for using voice. Routing may take place using cross-banding and cross-protocol.

IP for Dispatch

FSI call set up may provide for dispatch calls and directed calls within a single system as well as directed calls within a single system. One embodiment provides that for dispatch calls, there is no call set up required and TGIDs are mapped to multicast IP addresses (typically in the range of 224.5.0.1 to 224.5.255.255). For example, talk group ID (TGID) 14 may be mapped to multicast IP address 224.5.0.14 and in another example, TGID 42658 may be mapped to multicast IP address 224.5.166.162. In this manner, the CAI is extended into the IP domain.

Directed calls (that is, Telco and UID calls) may be conducted within a single system using a call set up routine. In this manner, TGIDs may be mapped to a multicast IP address (typically in the range 224.6.0.1 to 224.6.255.255) without additional delay.

The present system also allows for interoperability and intersystem access. For example, for calls involving more than one system, the multicast IP address may be in the range of 224.7.0.0 to 224.7.255.255. The RFSS of one system may negotiate with another system for purposes of selecting an address and selecting common protocols. In addition, the present system allows gateways or edge routers.

In one embodiment, multicasting and RTP are used to convey radio traffic. Various methods of mapping of talk groups are contemplated. Each talk group includes one or more subscriber radio units. The members of a first talk group may include a group of firefighters, each assigned to a particular fire truck. The members of a second talk group may include firefighters from a particular fire station. The members of a third talk group may include firefighters from a particular city. Talk groups may also be established based on skills, organizational units, or other predetermined criteria.

Talk group ID's may be mapped to a multicast address according to predetermined criteria. In one embodiment, the mapping is a function of a mathematical equation, direct mapping by static assignment, dynamic mapping, and virtual mapping. Multicast IP addresses are typically in the range of 224.5.0.1 to 224.5.255.255.

By direct assignment, a particular talk group ID may be assigned to a multicast address by a static, programmed relationship. In this case, talk group members are unable to control or alter their membership.

Talk group members may be assigned to a multicast address by a mathematical mapping function. The mapping function may entail an offset value that is added to a talk group ID number, thereby yielding an address. Other mathematical mapping functions are also contemplated.

Virtual Circuit Fiber (VCF)

One embodiment of the present system provides interconnections using VCF to create a network connection for audio. In one embodiment, the VCFs are assigned wide area calls (WAC) which include mappings of multiple site, home and talk group combinations. The system can process WACs in excess of the number of VCFs since, statistically, not all calls will be active simultaneously. The VCFs are trunked out to WACs, in one embodiment, based on priority and WAC inactivity. In one embodiment, when a user accesses the system and his site, home, and a group of system users, is in a particular WAC, then the present system attempts to find an available VCF to fulfill the call request. After the WAC is associated with a VCF, an inactivity timeout, referred to as a wide area call hang, is introduced. The wide area call hang allows the receiving radios to immediately respond to the call. A time delay is introduced on initial key up of a WAC and no delay is introduced on subsequent traffic starts of the same WAC.

In one embodiment of the present system, the regional controller act as a switch. The regional controller assigns multicast addresses to each WAC, thereby providing virtual VCFs. The present system may be implemented in software, thus eliminating direct hardware costs and enabling access to a large number of multicast addresses, thereby reducing resource contention. The present system also includes the ability to set the number of resources and perform testing of the configuration. The number of virtual circuits may be later changed with suitable programming changes.

Using VCFs

To place an outgoing call, a user keys up and if the user's talk group is affiliated with other sites, then the regional controller assigns that talk group to a particular multicast address. This assigned multicast address is then sent to all sites, allowing sites with that talk group affiliated to register to receive packets addressed to that multicast address.

According to one embodiment, a user keys up, and if the user's talk-group is affiliated with other sites, the regional controller assigns that talk group a multicast address. This assignment would be sent to all sites, allowing sites with that talk group affiliated, to register to receive packets addressed to that multicast address.

In trunking the requesting radio's site would send request message. When the packet, or packets, are received, the other sites send a ready message back to that site controller stating that they are ready to receive the call. When the site controller receives a ready message from all sites with active affiliation on that talk group, the site controller assigns the radio a channel and that assigned channel then transmits that radio IMBE traffic on the assigned multicast address. With this address assigned, any other radio at this or any other site is able to rapidly use this VCF with little or no setup delay time. When a radio affiliates on a site, the site checks for an existing multi-cast address and, if found, registers to use it.

Site Bandwidth

Trunking typically involves a delay in which the originating subscriber unit waits for network call setup completion. During the delay period, one embodiment performs a check as to the availability of wide area resources before allowing the subscriber to access the system. If a site receives a request to handle a call for which there is no resource available, the subscriber unit would receive a signal and the call would not be assigned to a traffic channel. In this manner, call volume to a site can be restricted.

In conventional mode, since the site can not control the subscribers unit's access, one embodiment provides that the site sends an insufficient resource message to the requesting subscriber after the call attempt. The site, since it did not receive positive response messages from all the needed sites may refuse to source on that WAC multicast address, thus preserving bandwidth integrity.

Operation Modes a) Fixed—Repeaters Only, No Servers

Figure 6:
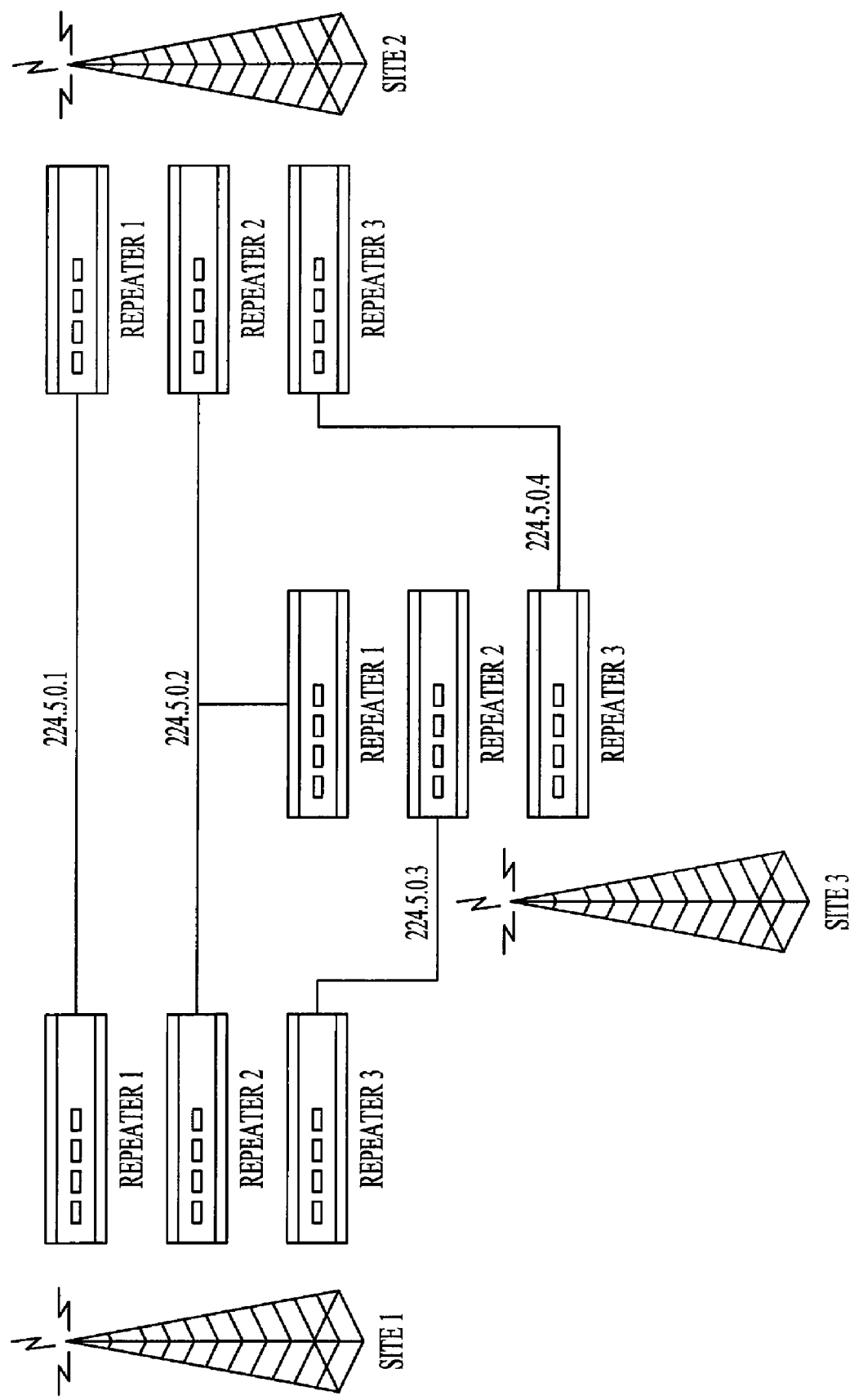
FIG. 6 illustrates an operational mode of one embodiment of the present system.

In this mode, support from the RFSS infrastructure is unnecessary. Each repeater is assigned a fixed multicast address. All packets received by the repeater, including voice, as well as link control words, is forwarded to this address. In FIG. 6, the IP addresses are shown associated with each link, however, the programming may be included in the repeater. Thus, a console may be able to listen to wide area group 1 and receive all calls between site 1 repeater 1 (SIRI) and site 2 repeater 1 (S2R1). A conventional console may be connected via an interface box, or alternatively, a console may be adapted to use an IP interface. The console may provide several functions, including one which allows sorting of the individual talk-groups from the LCWs. A repeater may be adapted for this function by adding address configuration and disabling trunk-group to address mapping.

b) Fixed—VCF (Virtual Circuit Fiber)

Figure 7:
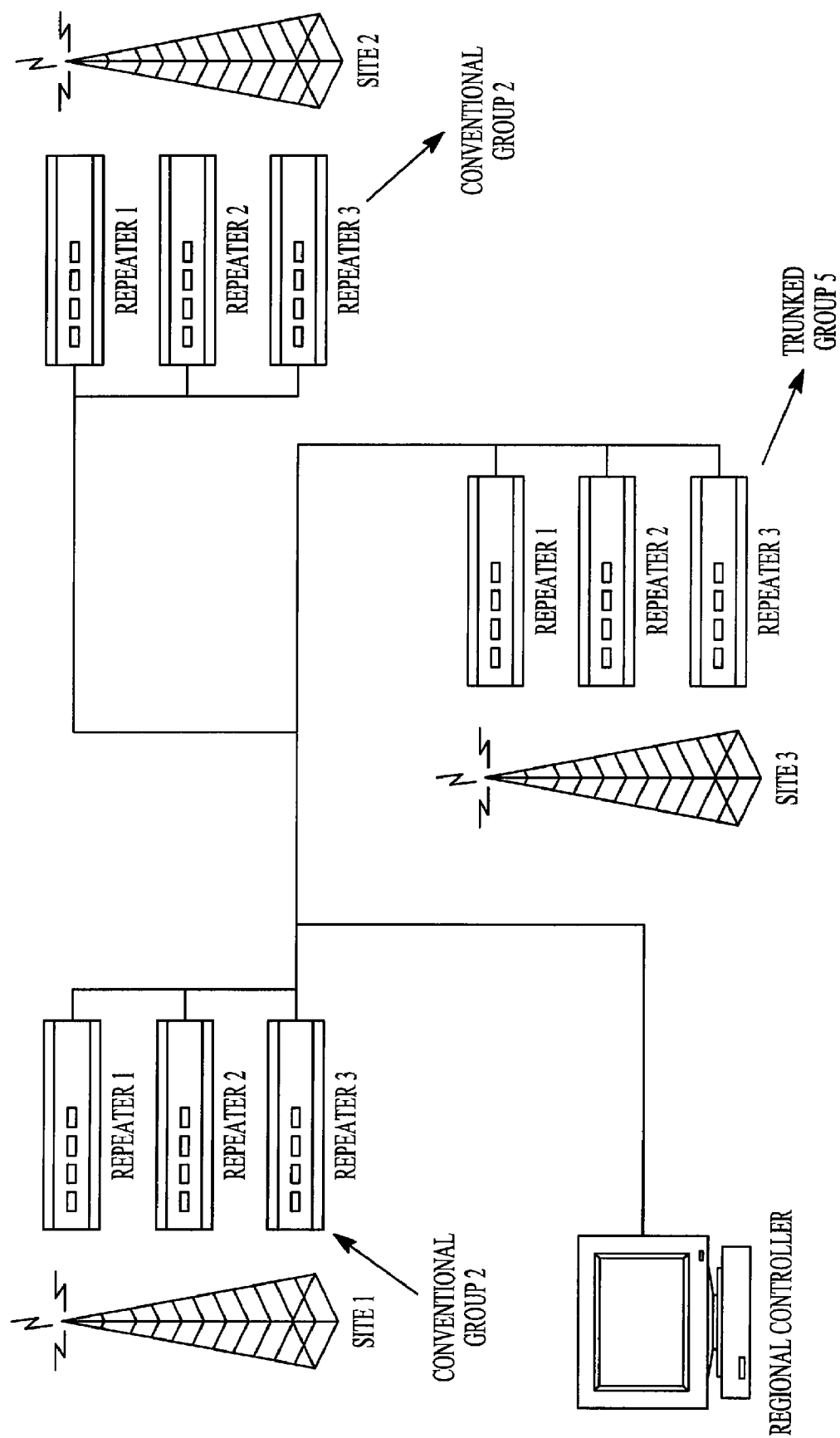
FIG. 7 illustrates an operational mode of one embodiment of the present system with a regional controller.

This mode, illustrated by FIG. 7, allows inter-operation between trunking and conventional channels. Conventional calls received on a repeater are moved to a fixed alias talk-group. Each repeater includes programming to provide the mapping. In addition, the repeater is assigned an alias UID that may be used in the authentication messages. The repeater then sends authentication and access requests as in the trunking operation. The alias talk group and UID may be used for these messages. The system may respond with an assignment of a VCF after which the repeater then uses this VCF for conventional traffic unless notified by the system that the VCF expired. Following expiration of a VCF, the next conventional call causes the repeater to request a new VCF. The repeater sends the control words in the RTP packet in the voice stream so that if received by conventional repeaters, the original talk group will be communicated to the radios. Trunking repeaters strip these packets out of the stream and fabricate new LCW packets based on the alias information provided by the system when the call was initiated, thus, providing interoperability.

In the figure, conventional group 2 keys up on site 1. It is authenticated and assigned to a VCF. The repeaters are programmed to send all conventional traffic to talk group 5. The conventional repeater on site 2, having registered as a conventional channel and assigned to the TG5 VCF, receives the call and sends it out to conventional group 2. On site 3, a trunked site with a radio affiliated on TG5, the call goes out on TG5.

c) Dynamic—VCF

Figure 8:
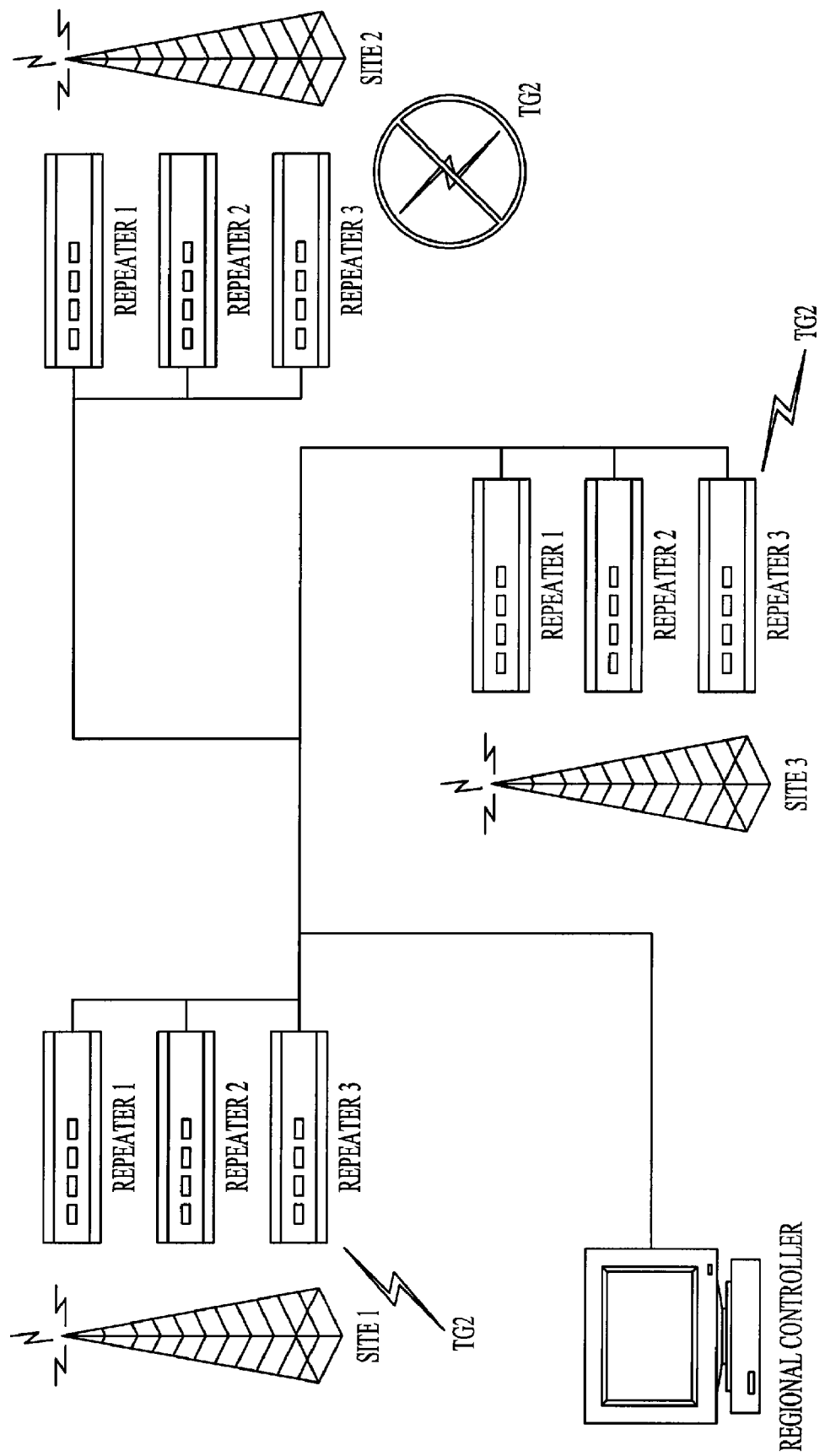
FIG. 8 illustrates an operational mode of one embodiment of the present system.

One embodiment of this mode, illustrated in FIG. 8, combines interoperability with trunking. Each conventional talk group is detected and a VCF requested of the server. The initial call on a particular talk group causes the repeater to request a VCF for the talk group. That VCF is preserved and future calls are carried without setup delay. This embodiment results in a brief delay associated with detecting the talk group. Unless a radio on a particular site had keyed up on a given talk group, then that particular site would not participate in a VCF created for the given talk group by other sites. Thus, conventional radios may interoperate on all groups with trunked radios.

In one embodiment, a trunking system includes one channel per site and either of the previous two interoperability modes could be used to support existing conventional radios.

In the figure, site 1 and 2 are conventional and 3 is trunked. A user, a supervisor in this example, is affiliated on TG2 on site 3. Two users have a conventional radios on TG2 with one on site 1, and the other on site 2 and the figure assumes that none have keyed up on this system yet. When the supervisor on site 3 keys up, no radio hears him and he may assume no one is listening. Later, the user on site 1 keys up resulting in authentication and assignment of a VCF. Site 3, since it has an affiliated TG, is notified of the VCF. The call is set up and passed through following the call setup period. The users on sites 1 & 3 can then talk to each other. Unless the user on Site 2 originates a call, it may not hear the calls.

Call Sequences

All calls that are handled mobile radio (MR) to MR and calls MR to base station (BS) to MR may be handled by the appropriate specifications. This section describes calls, in one embodiment, that pass from the FS through the Ethernet interface. The Ethernet interface may include an interface compatible with IEEE 802.2.

Group Voice Call

Figure 9:
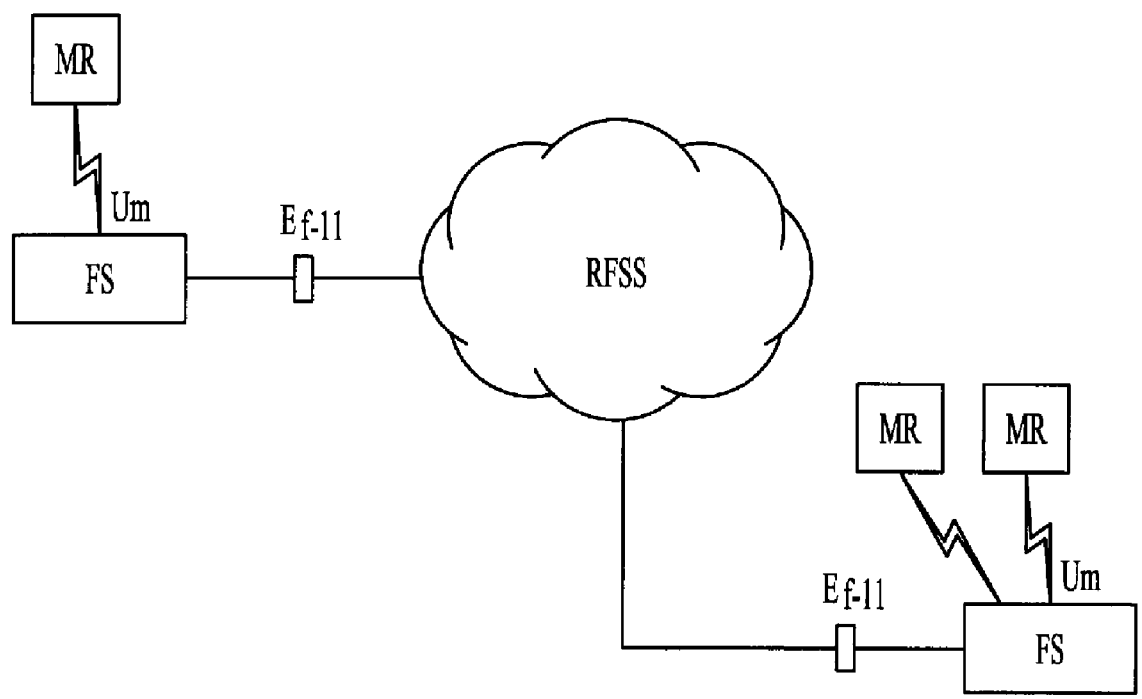
FIG. 9 illustrates a group voice call in accordance with one embodiment of the present system.
Figure 10:
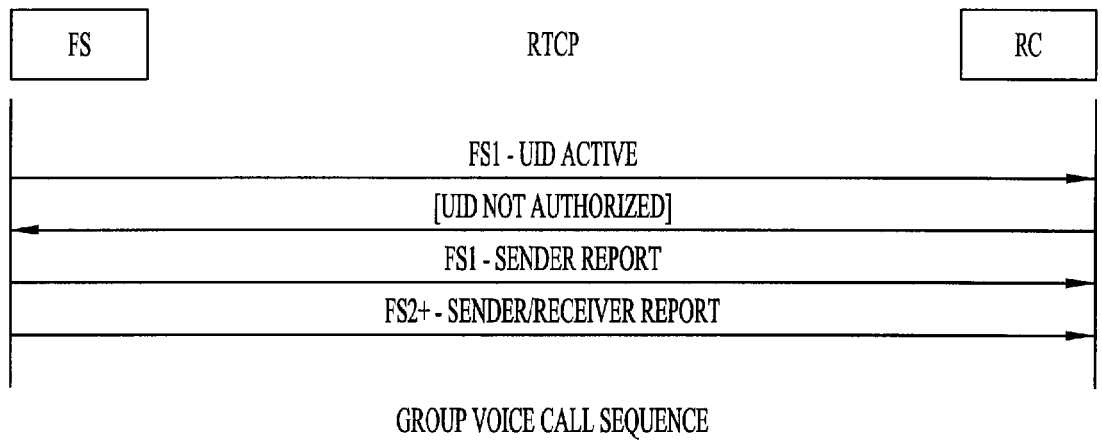
FIG. 10 illustrates a method in accordance with one embodiment of the present system.

FIG. 9 illustrates a block diagram of a group voice call and FIG. 10 illustrates a sequence for executing the call. Each FS holds all packets received from the OTA interface until the first link control word (LCW) is received. The talk group is then extracted and the multicast address selected. The FS then sends out all queued voice packets as well as the LCW command packet. All FSs with a radio affiliated with that talk group will have registered for that multicast address.

The FS also sends a control packet to the regional controller (RC) notifying her that the specified UID is active on that talk group. Voice and command packets continue to be sent for the duration of the transmission unless the regional controller responds that the call is not authorized. In that case, the FS fabricates an end call packet and ceases to send packets associated with the call. The FS may optionally cache authorization information. At the end of the call segment, all FSs involved in the call send a sender or receiver report for accounting purposes.

Individual Voice Call

Figure 11:
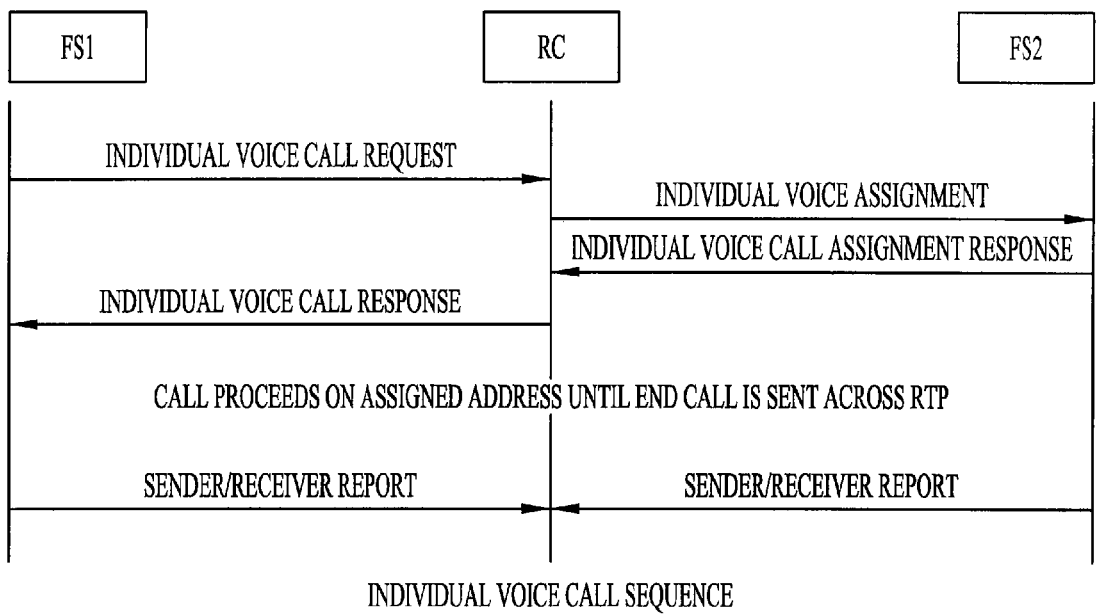
FIG. 11 illustrates a method in accordance with one embodiment of the present system.

FIG. 11 illustrates a sequence for an Individual Voice Call wherein, when the FS receives a request from the MR, it sends a request to the RC. The RC looks up the registered site of the destination unit and assigns a multicast address. The RC then sends an Individual Voice Call Assignment to the destination FS or SC. The destination SC assigns a FS which registers for the multicast address and sends a Individual Voice Call Assignment Response back to the RC. The RC in turn sends an Individual Voice Call Response back to the originating FS. The originating FS then sends a connection established message to the MR and the call is connected. On call completion, both the originator and destination send a report to the RC detailing the call statistics. Once both messages are received, the multicast address is available for reuse. If no channels are available at the destination site, the SC will send a NACK to the RC who then sends the NACK to the originating FS. The originating MR is told to try again later and the call is terminated.

Inter-System Calls Group Voice Calls

Figure 12:
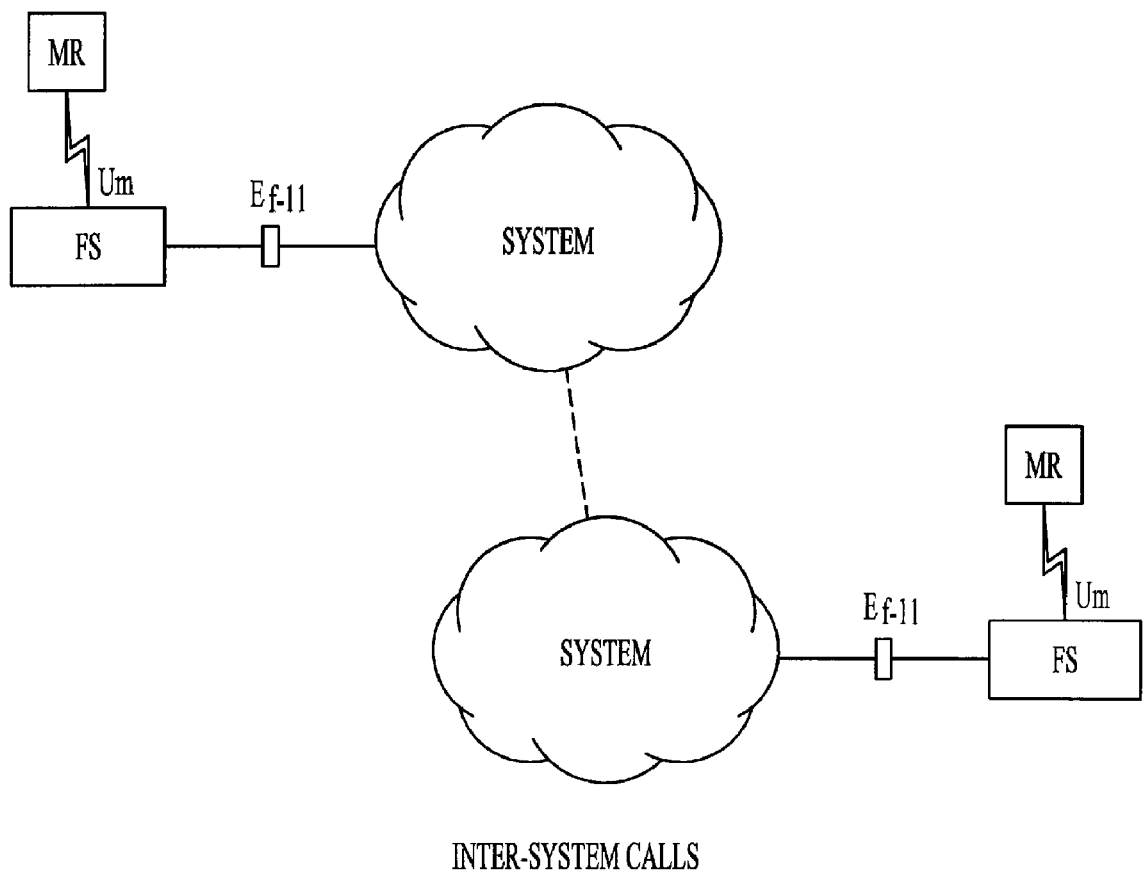
FIG. 12 illustrates an inter-system call in accordance with one embodiment of the present system.
Figure 13:
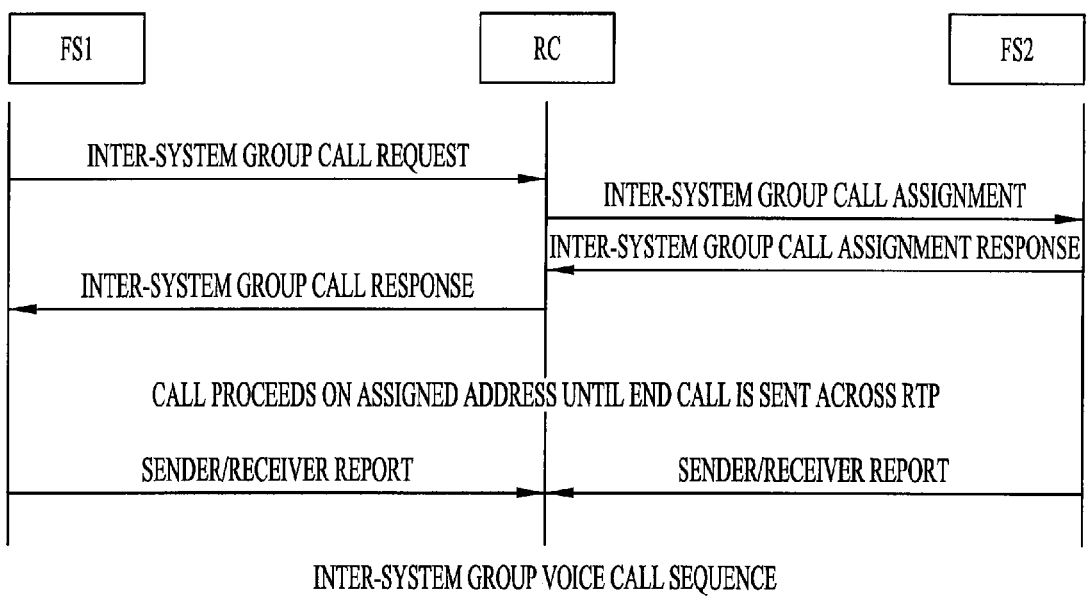
FIG. 13 illustrates a method in accordance with one embodiment of the present system.

FIG. 12 illustrates a block diagram for an Inter-system Calls Group Voice Call and FIG. 13 illustrates a corresponding sequence. If the Network ID, System ID or RFSS ID of the destination address of any call type do not match the originator, then the call is directed by the RC. The FS sends a request to the RC. The RC finds the destination and negotiates with the RC in control of that RFSS for an address on which to carry the call. The source RC then sends this address assignment to the originator. Meanwhile, the destination RC instructs the destination site to register for the assigned multicast address.

Inter-System Individual Voice Call

The Individual Voice Call sequence contains the information to handle inter-system calls. This sequence includes an assignment of an address from the inter-system block to allow the routers to correctly handle the multicast routing.

Broadcast Voice Call

Figure 14:
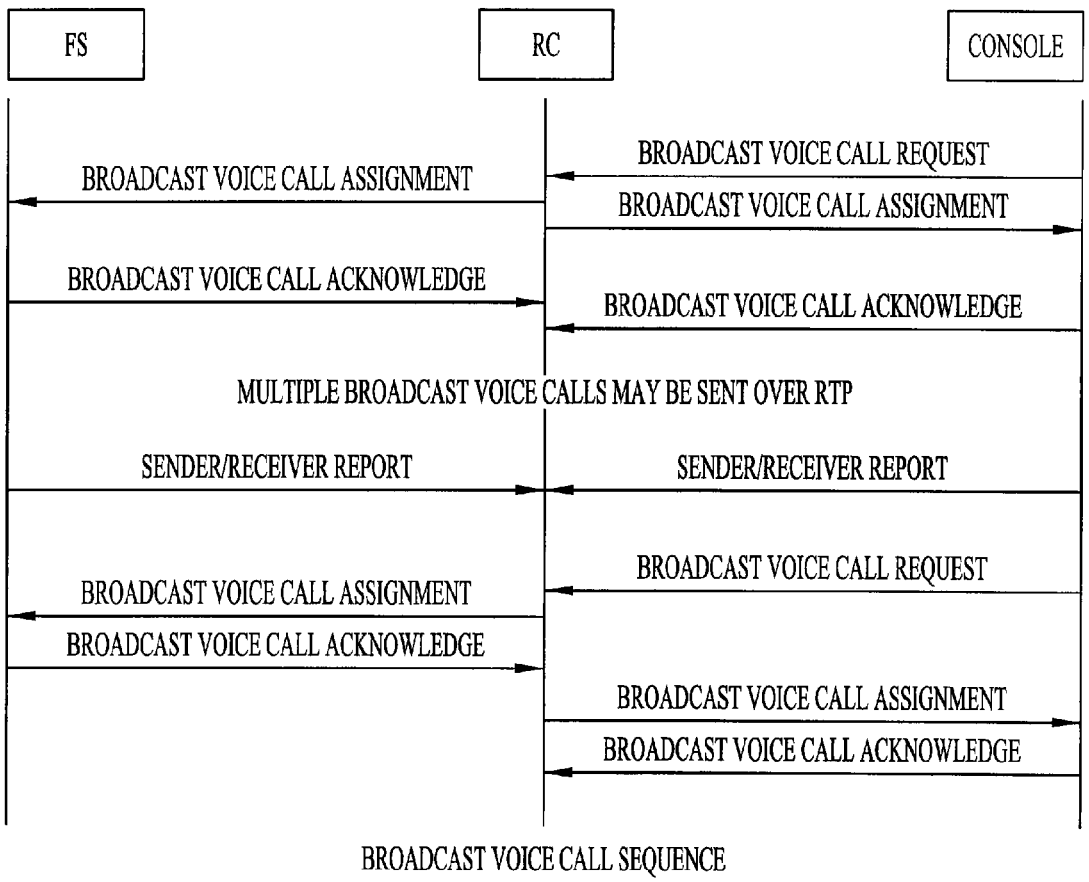
FIG. 14 illustrates a method in accordance with one embodiment of the present system.

A Broadcast Voice Call, illustrated in FIG. 14, is sent out with a group address of $FFFF. This type of call may be repeated locally and sent over the network for console and other devices.

Unaddressed Voice Calls

Figure 15:
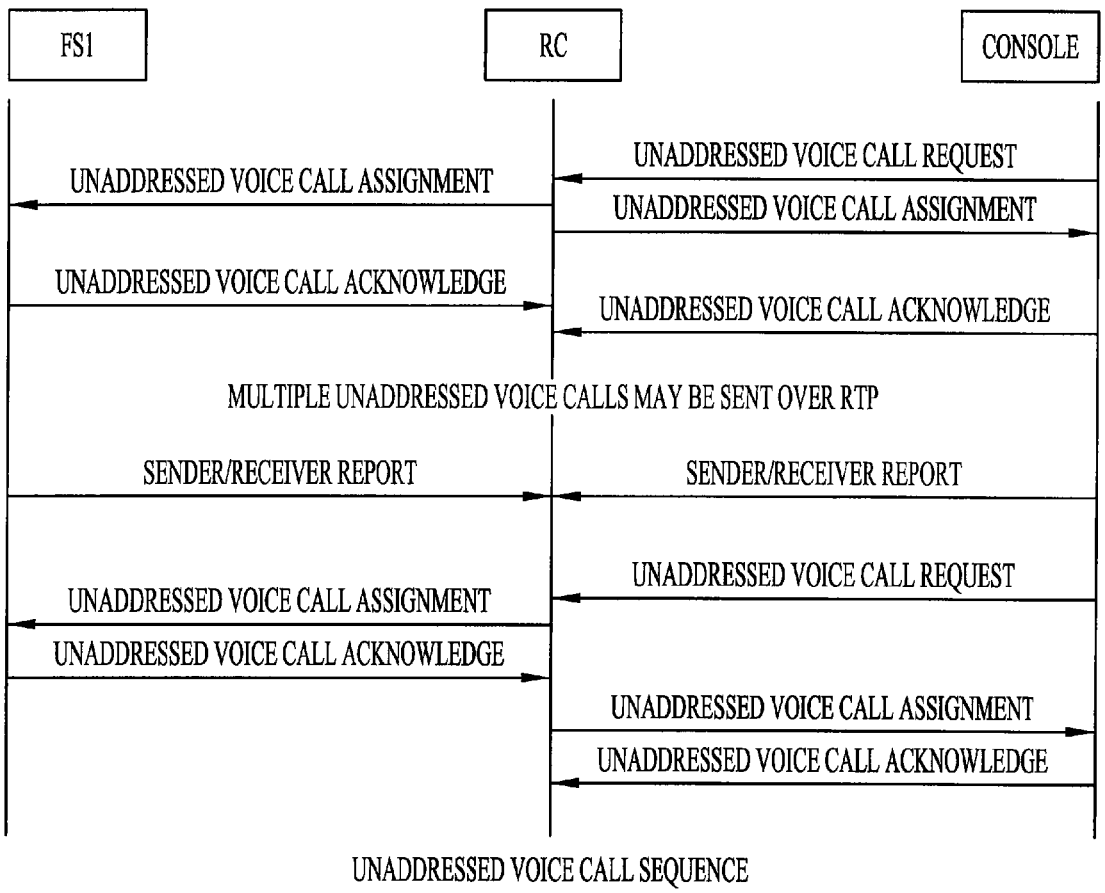
FIG. 15 illustrates a method in accordance with one embodiment of the present system.

Unaddressed Voice Calls, illustrated in FIG. 15, when originated by a MR, are repeated to the local site, but may not be sent to the infrastructure. These calls are identified by group address of 0. If a console is attached to the system and wants to receive these calls for a particular site or sites, the console registers with the RC who assigns an address in the directed call block to each site. The SC or FS and the console or gateway are each sent an Unaddressed Voice call Assignment Message. The FS involved will then send all calls received with a group address of 0 to the specified address. No FS will receive and retransmit these calls from the IP interface. In order to stop the calls, the console sends another Unaddressed Voice Call request to the RC indicating it wishes to stop receiving the calls. Once the response is received by the console it unregisters for the multicast address and sends an acknowledge back to the RC to allow the address to be released and reused.

Preprogrammed Data Message

Figure 16:
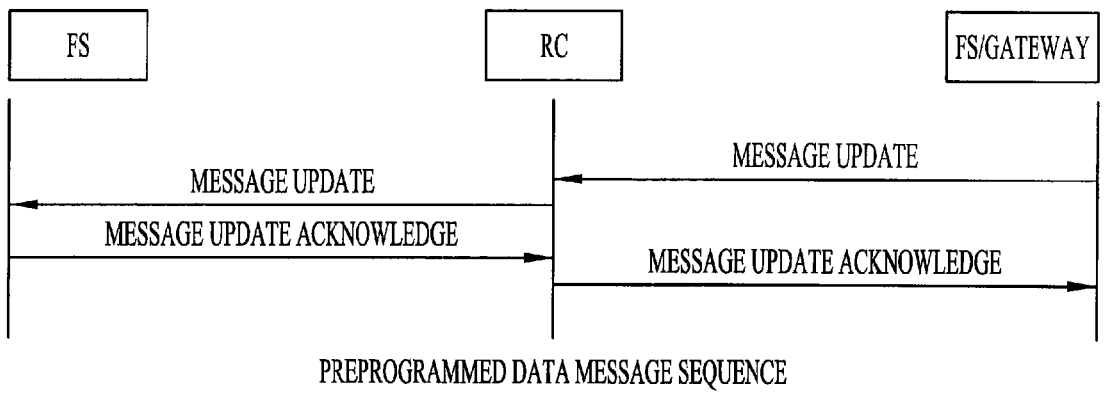
FIG. 16 illustrates a method in accordance with one embodiment of the present system.

A Preprogrammed Data Message request, a sequence of which is illustrated in FIG. 16, can originate from either an MR or a landside gateway. The landside origin could be e-mail or touch-tone DTMF and the interface is handled by the gateway function.

Voice Telephone Interconnect

Figure 17:
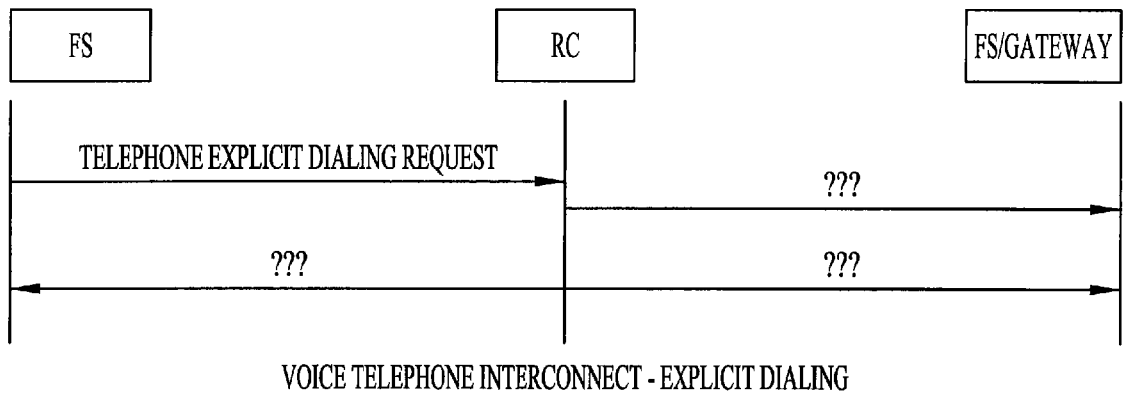
FIG. 17 illustrates a method in accordance with one embodiment of the present system.
Figure 18:
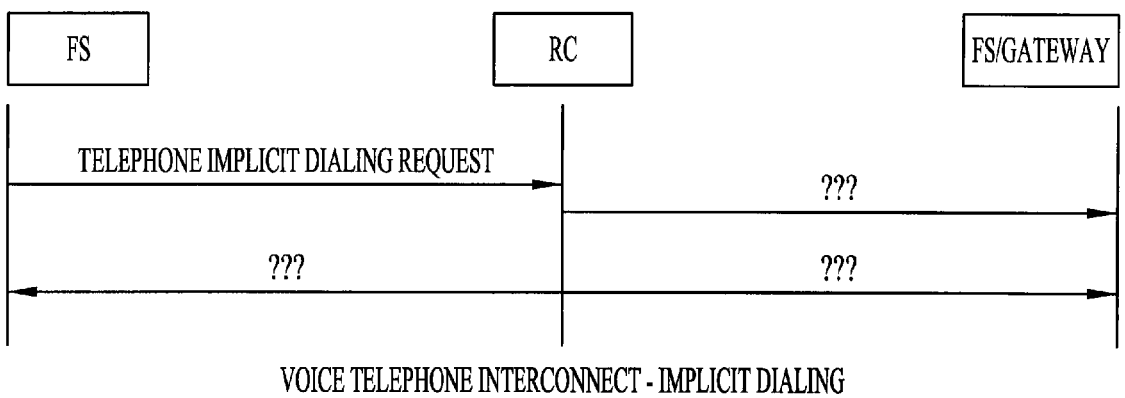
FIG. 18 illustrates a method in accordance with one embodiment of the present system.
Figure 19:
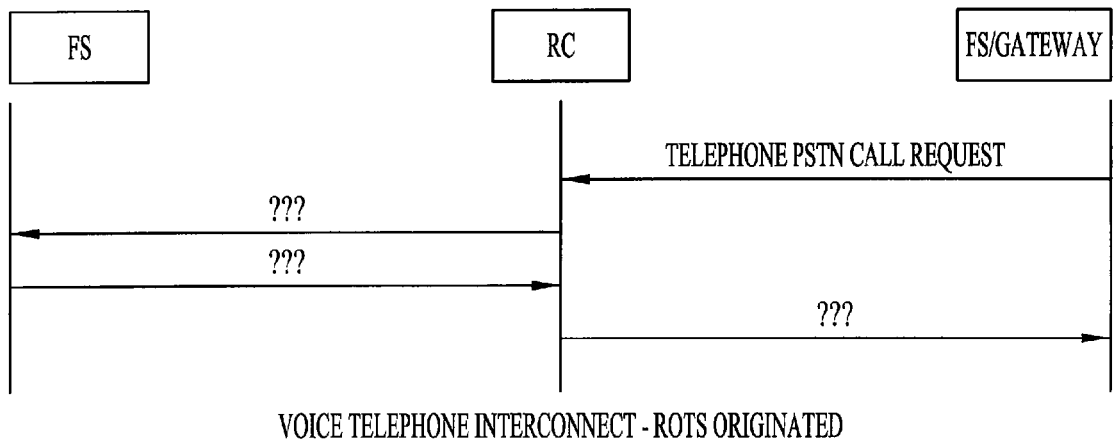
FIG. 19 illustrates a method in accordance with one embodiment of the present system.

Telephone calls may be MR originated, explicit dialed, MR originated and implicit dialed, or POTS originated, as illustrated in the sequences of FIG. 17, FIG. 18, and FIG. 19.

Radio Unit Monitoring

Figure 20:
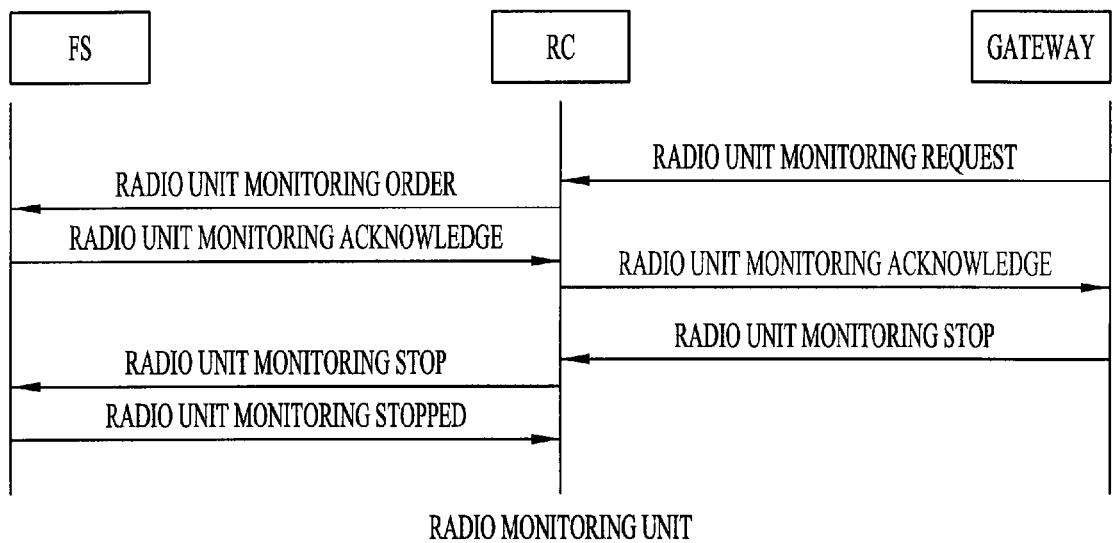
FIG. 20 illustrates a method in accordance with one embodiment of the present system.

The Radio Unit Monitoring, illustrated in FIG. 20, is sent from a console or gateway to a RC. If the unit requesting the call has sufficient permission, the RC sends a Discreet Listening Order to the FS with a multicast address. The FS sends an acknowledge back to the RC and sends the appropriate message to the MR. The RC sends an acknowledge back to the requestor who registers for the appropriate address.

Discreet Listening

Figure 21:
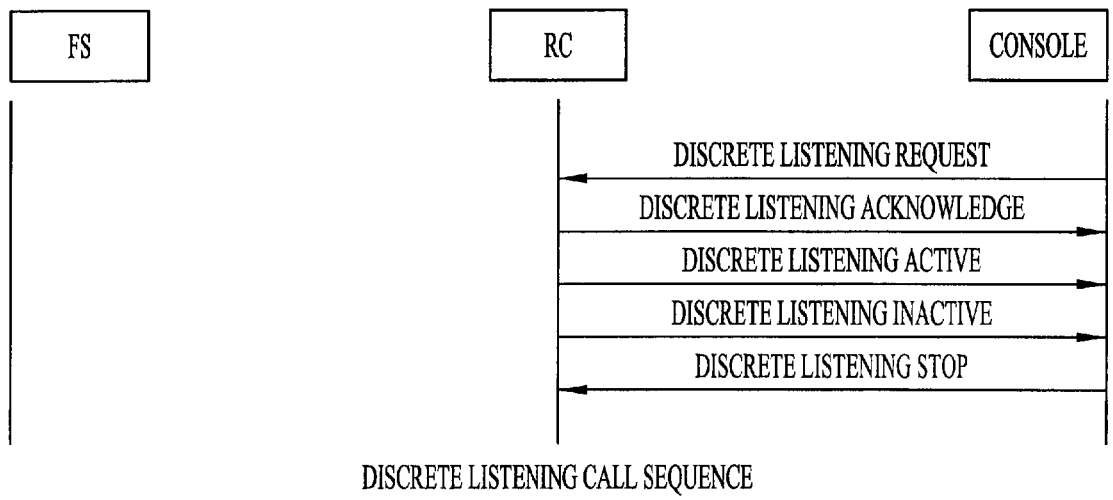
FIG. 21 illustrates a method in accordance with one embodiment of the present system.

FIG. 21 illustrates a Discreet Listening sequence. A console with sufficient permission can request to listen to any call on the system. Group Calls and broadcast calls are handled by other means. In addition, a console can request access to individual calls based on source or destination UID. These messages are solely between the RC and the console. The RC will send the multicast address for any Individual Call to the console for monitoring.

Silent Emergency

Figure 22:
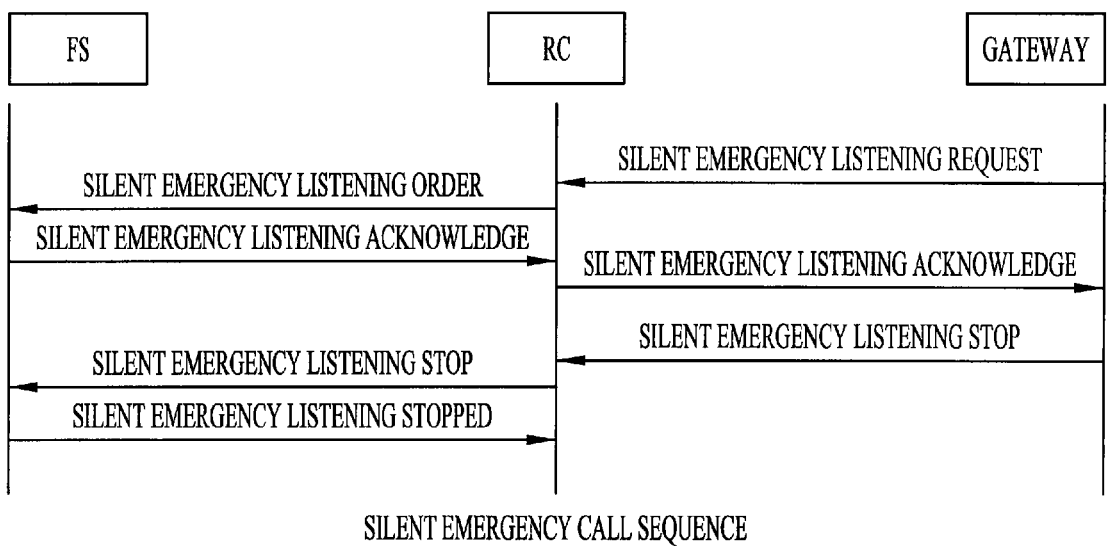
FIG. 22 illustrates a method in accordance with one embodiment of the present system.

Silent emergency calls, as illustrated in FIG. 22, may be transmitted from an MR. A Silent Emergency call contains voice and an indication that an emergency situation exists. No indication is given at the MR that this is in progress.

Packet Formatting

In one embodiment, each IP packet header contains the P25 data and the packet payload contains the voice frames and other data is included in a control plane.

In one embodiment, a sub-header may be described as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|       Envelope Type           |         Length (Bytes)        |
|                             Payload...                        |
+-+-+-+-+-+-+-+-+-+-+-+-+-+-+-+-+-+-+-+-+-+-+-+-+-+-+-+-+-+-+-+-+
```

One embodiment of the present system allows for multiple data envelopes within a single packet. For example, IMBE voice data may be envelope type 0 and with three 11-byte frames this yields:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|               0               |              33               |
|                           Frame 0 ...                         |
|                           Frame 0 ...                         |
|          Frame 0 ...          |          Frame 1 ...          |
|                           Frame 1 ...                         |
|                           Frame 1 ...                         |
|          Frame 1 ...          |          Frame 2 ...          |
|                           Frame 2 ...                         |
|                           Frame 2 ...                         |
|          Frame 2 ...          |            Padding            |
+-+-+-+-+-+-+-+-+-+-+-+-+-+-+-+-+-+-+-+-+-+-+-+-+-+-+-+-+-+-+-+-+
```

The decoded Link Control Words (LCW) may be envelope types 1 & 2, as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|               1               |              9                |
|      MFID     |  Reserved |E| |           TGID ...            |
|           Source ID ...       |            Padding            |
+-+-+-+-+-+-+-+-+-+-+-+-+-+-+-+-+-+-+-+-+-+-+-+-+-+-+-+-+-+-+-+-+

0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|               2               |              9                |
|      MFID     |                 Destination ID ...            |
|           Source ID ...       |            Padding            |
+-+-+-+-+-+-+-+-+-+-+-+-+-+-+-+-+-+-+-+-+-+-+-+-+-+-+-+-+-+-+-+-+
```

The 240-bit Encoded LCW may be envelope type 3:

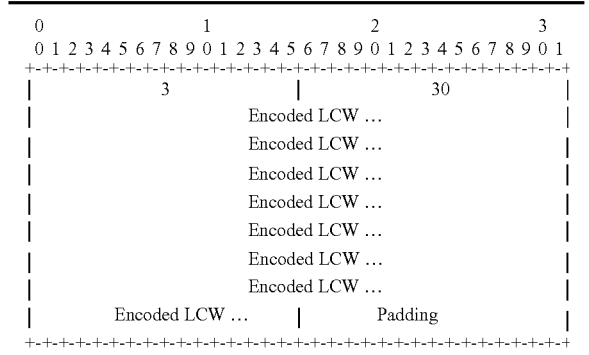

The low speed data may be envelope type 4:

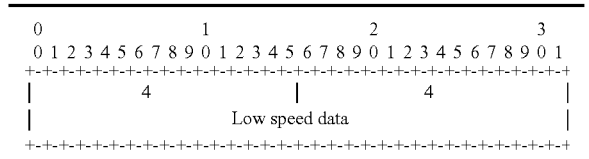

Other envelope types may be specified for other codecs such as G.711, GSM, and G.729. manufacturer interoperability data may also be assigned an envelope type. Thus, a first station may send IMBE for a second station and PCM for a console of a data recorder in the same RTP packet. According to one embodiment, the overall RTP payload type may be defined as dispatch radio, burst oriented communications, half-duplex transport or orther generic scope in a manner that allows compatibility with different radio protocols, including, for example, Smart-Net/Smart-Zone, EDACs, Multi-Net, TETRA, and others.

In addition, the envelope type may be separated into manufacturer ID (MFID) and type with a MFID of 0 signifying a common type. Each manufacturer may then assign and add proprietary types.

Digital Operation and Voice Over IP

The voice over IP (VoIP) interface may be implemented in lieu of, or in addition to, other interfaces providing digital or analog communications to RFSS. In one embodiment, the VoIP interface is implemented as the sole FS interface. In one embodiment, the VoIP interface is implemented in conjunction with a serial interface which may provide backwards compatibility with equipment and infrastructure of other manufacturers.

The interface may carry P25 traffic including clear or encrypted signals representing either voice, data, or both.

Figure 23:
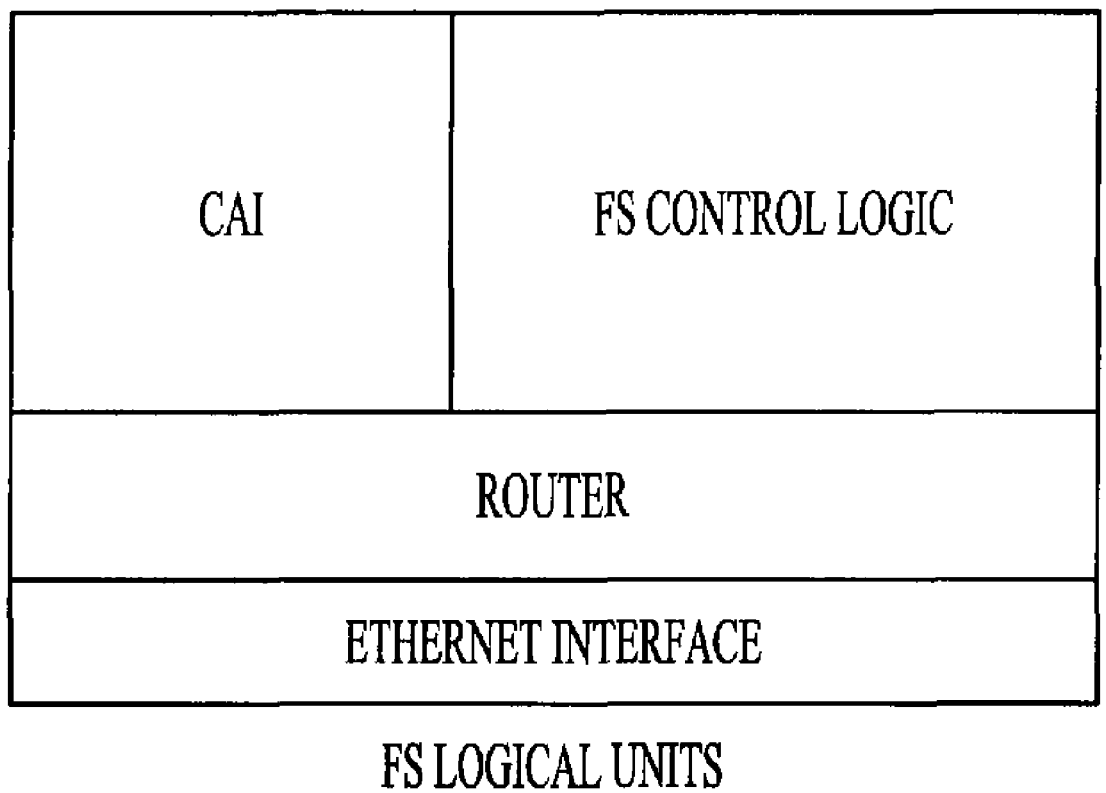
FIG. 23 illustrates a model of FS logical units.

A FS may be thought of a as a set of logical functions, each of which may be packaged differently in different implementations. FIG. 23 depicts the FS as logical units.

The FS may include a multi-port router. The FS is adapted to route data packets from the Ethernet interface to the CAI when operating in data mode where a mobile data peripheral (MDP) has an assigned IP address. The FS may also be adapted to route data packets from the Ethernet interface to the FS control logic which may be the IP endpoint for voice traffic and control information. The router function also may include an IP address to allow it to send and receive IGMP updates for its routing tables.

The common air interface (CAI) unit is responsible for transmission of the over the air packets. It needs to know how to tunnel IP to a particular MDP (mobile data peripheral) over the CAI. It also accepts voice and link control words from the FS control logic unit. Upon receipt of a CAI packet, the CAI decodes the packet type and pass it on to the FS control logic unit or the router unit based on the contents.

The FS control logic converts CAI voice and control packets to IP packets and from IP packets. The FS control logic unit also handles the RTCP messages with the regional controller function.

The router unit routes IP packets. The router unit also maintains the routing table for all MDPs on this site.

The Ethernet interface is the low level interface used by the router unit to send and receive IP packets over the network.

For VoIP operation the FSI is defined using four layers of the OSI reference model: the physical layer, data link layer and network layer. The remaining protocols fall within the realm of the application layer. The following table illustrates the FSI and its relation to the OSI reference model.

TABLE 1

| VoIP FSI Relationship to the OSI Reference Model | | |
|---|---|---|
| | | Fixed Station/RFSS |
| 7 | Application Layer | RTP/RTCP/MGCP... |
| 4 | Transport Layer | UDP         TCP |
| 3 | Network Layer | IP |
| 2 | Link Layer | Ethernet |
| 1 | Physical Layer | 10baseT |

Layer 1—Physical Layer

The Fixed Station Interface may include an interface operating 10baseT and it may include a higher speed interface.

Layer 1 for the FS operating in digital mode may be a subset of the signals defined by IEEE 802.3. The FS and RFSS may be coupled using RJ-45 jacks, thus allowing direct connection to industry standard hubs and routers using category 5 (Cat5) patch cables. Other industry standard connectors for this type of interface may also be used.

Layer 2—Data Link Layer

Layer 2 for the FS operating in digital mode may be a subset of the Ethernet protocol defined by IEEE 802.2. The FS and RFSS may conform to an industry standard for connection to Ethernet hubs and routers.

Layer 3—Network Layer

Layer 3 for the FS operating in digital mode may include a subset of the IP protocol defined by IETF RFC791, reference. The FS and RFSS may conform to an industry standard for connection to Ethernet hubs and routers.

Layer 4—Transport Layer

Layer 4 for the FS operating in digital mode may be a subset of the UDP/TCP protocols defined by IETF RFC768 & RFC793. The FS and RFSS may conform to an industry standard for connection to Ethernet hubs and routers.

Layer 7—Application Layer

Dispatch Radio Voice RTP Profile (DRVRP) provide an addressing scheme and a packetization and control protocol for handling standard dispatch calls in both conventional and trunked systems. The data may be carried via RTP and the control may be carried via RTCP. DRVRP is described below.

One embodiment of control messages passed between the FS and the RFSS are below.

Dispatch Radio Voice RTP Profile (DRVRP)

Addressing

In one embodiment, a reserved multicast address is utilized. The address may be reserved through an authority such as the Internet Assigned Names authority (IANA). An addressing scheme for one embodiment is outlined in Table 2.

TABLE 2

| Multicast addresses | |
|---|---|
| 224.5.0.0 | RFSS identification messages |
| 224.5.0.1-224.5.255.255 | Dispatch calls within a single system |
| 224.6.0.0-224.6.255.255 | Directed calls within a single system (eg; Telco and UID calls) |
| 224.7.0.0-224.7.255.255 | Calls involving more than one system. |

Specific port numbers may also be reserved via request to an authority such as IANA. One embodiment utilizes the following port numbers:

TABLE 3

| Port Numbers | |
|---|---|
| 10110 | Voice RTP messages |
| 10111 | Voice RTCP messages |

In some instances, the conversation length of a dispatch communication is shorter than the setup time for a telephony call. Thus, it may be desirable for the FS to put the call on the network as soon as it identifies the source of the call. In one embodiment, this is accomplished by directly mapping a talk group ID (TGID) to a multicast address. For example, the lower two bytes of the four byte multicast address may include the 16 bit TGID. Thus, if a radio keys up on TGID 14, then the voice packets will be sent to multicast address 224.5.0.14, and for talk group 42658, the address would be 224.5.166.162.

In one embodiment, addresses for directed calls and inter-RFSS calls are allocated by the regional controllers and gateways respectively.

RTP

In one embodiment, the FSI processes two types of data, namely voice and control traffic derived from the FS CAI, and messages associated with the exchange of control and management information between the FS and the RFSS. In one embodiment, RTP provides the mechanism for transporting the voice and CAI control packets.

RTP Header

The FS may also support a subset of the RTP/RTCP protocol defined in IETF RFC 1889. In one embodiment, each packet, either voice or control words, contains an RTP header. The RTP header may include 96 bits or 12 bytes. The header for a FS voice/command packet may contain the following:

TABLE 4

| RTP Header Field Descriptions | | | | | | | | |
|---|---|---|---|---|---|---|---|---|
| Version | Pad | Ext | CSRC | Marker | Payload | Seq | TS | SSRC |
| 2 | 1 | 1 | 4 | 1 | 7 | 16 | 32 | 32 |

| Version, 2 bits | Contains the RTP version number. For example, the version may be 2. |
|---|---|

TABLE 4-continued

| RTP Header Field Descriptions | |
|---|---|
| Padding, 1 bit | Set if padding bytes are added for encryption algorithm. |
| Extension, 1 bit | Set if header extension is used. |
| CSRC, 4bits | Count of contributing Sources. Since each FS acts as an independent source, this field may be 0. This count indicates the number of contributing source identifiers that follow the header. |
| Marker, 1 bit | Set to denote a command packet, clear for voice packet. |
| Payload Type, 7 bits | Identifies format of RTP payload. This denotes the Codec used for voice packets. Examples of values of interest to an FS are as follows:<br>Value  Encoding<br>0  G.711 mu-law<br>2  G.721<br>4  G.723.1<br>8  G.711 A-law<br>9  G.722<br>15  G.728<br>18  G.729<br>19  IMBE |
| Sequence Number, 16 bits | This may be a sequentially incremented packet number. This number starts at a random number. |
| Timestamp | Timestamp (millisecond resolution, random start) |
| SSRC | Synchronization source (UID of radio) |

RTP Voice Packets

The RTP packet content for a voice packet may include the frame count and the voice data frame. In one embodiment, for the IMBE packet type, the default frame count is 3. In one embodiment, each frame contains 20 msec of voice data comprising 11 bytes.

Count—1 byte
Frame 1—11 bytes
Frame 2—11 bytes
Frame 3—11 bytes

In one embodiment, the FS is capable of receiving any number of frames per packet. The number that a particular FS sends per packet can be fixed to any number from 1 to 255 based on the balance between network bandwidth availability and delay. The frames per packet may be negotiated between a FS and a regional controller.

RTP Data Packets

Command packets may contain a single byte opcode followed by any associated data.

TABLE 5

| Command Word Opcodes and Data Lengths | | |
|---|---|---|
| Opcode | Data Octets | Description |
| 7 | 0 | Radio PTT (Voice Stream Start) |
| 8 | 0 | Radio DeKey (Voice Stream Stop) |
| 9 | 9 | Project 25 CAI Link Control Word |
| 10 | 11 | Project 25 CAI Link Control Word/Low Speed Data |
| 11 | 14 | Project 25 CAI Encryption Sync/Low Speed Data |
| 12 | 30 | Project 25 CAI Header Data Unit |

In one embodiment, the CAI data words are those defined by the P25 CAI. They repeated here only for convenience and it will be noted that other data words may be defined.

Project 25 CAI Link Control Word

This packet contains a Project 25 CAI link control word. This may be a variable format message that is defined by the TIA 102 standards. Common word examples are shown below for convenience.

TABLE 6

Project 25 CAI LC Formats Project 25 CAI Link Control Word/Low Speed Data

| 31 | 23 | 15 | 7 | 0 |
|---|---|---|---|---|
| Opcode = 9 | LCF Octet = 00 | Manufacturer's ID | E | Reserved |
| Reserved | | Talk-group ID | | Source ID (23-16) |
| Source ID (15-0) | | | | |

| 31 | 23 | 15 | 7 | 0 |
|---|---|---|---|---|
| Opcode = 9 | LCF Octet = 03 | Manufacturer's ID | | Reserved |
| Destination ID | | | | Source ID (23-16) |
| Source ID (15-0) | | | | |

This packet may contains a Project 25 CAI link control word. Additionally, a 32 bit low speed data word may be added to the end of the packet.

TABLE 7

Project 25 CAI LC/LSD Format

| 31 | 23 | 15 | 7 | 0 |
|---|---|---|---|---|
| Opcode = 10 | LCF Octet = 00 | Manufacturer's ID | E | Reserved |
| Reserved | | Talk-group ID | | Source ID (23-16) |
| Source ID (15-0) | | LSD (31-16) | | |
| LSD (15-0) | | | | |

Project 25 CAI Encryption Sync/Low Speed Data

This packet may contain a Project 25 CAI link control word. Additionally, a 32 bit low speed data word may be added to the end of the packet.

TABLE 8

Project 25 CAI LC/LSD Format

| 31 | 23 | 15 | 7 | 0 |
|---|---|---|---|---|
| Opcode = 11 | | Message Indicator (71-48) | | |
| Message Indicator (47-16) | | | | |
| Message Indicator (15-0) | | Algorithm ID | | Key ID (15-8) |
| Key ID (7-0) | | Low Speed Data | | |

Header Data Unit

This packet may contain three pieces of information, namely, a) the data from the header control word; b) the 2 bit channel status codes as described with regard to CAI Channel Status Format; and c) the status of each of the 36 hex bytes in a 3 bit format as described with regard to Project 25 CAI HCW Status Format.

TABLE 9

Project 25 CAI Channel Status Format

| Value | | Description |
|---|---|---|
| 0 | 0 | Channel Status is unknown, use for talk around |
| 0 | 1 | Inbound Channel is busy |
| 1 | 0 | Channel Status is unknown, use for inbound or outbound |
| 1 | 1 | Inbound Channel is Idle |

TABLE 10

Project 25 CAI HCW Status Format

| Bit 2 | Bit 1 | Bit 0 |
|---|---|---|
| Uncorrectable Error | Error Count (0-3) | |

TABLE 11

Project 25 CAI HDU

| 31 | 23 | 15 | 7 | 0 |
|---|---|---|---|---|
| Opcode = 12 | | Message Indicator (bits 71-48) | | |
| Message Indicator (bits 47-16) | | | | |
| Message Indicator (bits 15-0) | | Manufacturer's ID | | Algorithm ID |
| Key ID | | Talk-group ID | | |
| HS1 HS2 HS3 HS4 HS5 HS6 HS7 HS8 HS9 HS10 HS11 | | | | |
| < HS12 HS13 HS14 HS15 HS16 HS17 HS18 HA19 HS20 HS21 > | | | | |
| HS22 HS23 HS24 HS25 HS26 HS27 HS28 HS29 HS30 HS31 HS32 | | | | |
| HS33 HS34 HS35 HS36 Reserved | | | | |

RTCP

In one embodiment, the FSI processes two types of data, namely voice and data traffic derived from the FS CAI and messages associated with the exchange of control and management information between the FS and the RFSS. In one embodiment, RTCP provides feedback on the quality of the transmission, transports the canonical name to resolve SSRC conflicts, and allows exchange of control information between the FS and RFSS. The frequency of the RTCP packets may be determined by the number of participants and the available bandwidth. Examples of definitions of particular fields are shown below:

Sender Report (SR) and Receiver Report (RR)

RTCP sender and or receiver reports may be used to provide statistics on the quality of the transmissions. The standard frame includes:

TABLE 12

Basic Structure of SR

| V | P | RC | PT = SR = 200 | length |
|---|---|---|---|---|
| | | SSRC of sender | | |
| | | NTP timestamp, most significant word | | |
| | | NTP Timestamp, least significant word | | |
| | | RTP Timestamp | | |
| | | Sender's packet count | | |
| | | Sender's octet count | | |
| | | SSRC_1 | | |
| Fraction lost | | | Cumulative packets lost | |
| | | Extended highest sequence number received | | |
| | | Interarrival jitter | | |
| | | Last SR | | |
| | | Delay since last SR | | |

TABLE 13

Basic Structure of RR

| V | P | RC | PT=SR=201 | length |
|---|---|---|---|---|
| | | SSRC of sender | | |
| | | SSRC_1 | | |
| Fraction lost | | | Cumulative packets lost | |
| | | Extended highest sequence number received | | |
| | | Interarrival jitter | | |
| | | Last SR | | |
| | | Delay since last SR | | |

This profile may be used to provide accounting information by appending particular words to the SR and RR for DRVRP. Words other than those enumerated herein may also be appended by individual protocol types. For example, Project 25 may append the words shown with regard to Project 25 Profile Specific Words for SR and RR.

TABLE 14

Project 25 Profile Specific Words for SR and RR

| Manufacturer | Protocol | Message Code for Call Type |
|---|---|---|
| WACN | | System ID |
| SSID | SID | Talk Group |
| Reserved | | UID |

Source Description Items (SDES)

This message may provide information on the source of a transmission.

TABLE 15

Basic Structure of SDES

| V | P | RC | PT=SR=202 | length |
|---|---|---|---|---|
| | | SSRC of sender | | |
| | | SDES Items | | |
| | | ... | | |

BYE

This message may be used to indicate that a sender is going offline. This message may be sent if a FS were to do an orderly shutdown and take itself off the air.

TABLE 16

Basic Structure of BYE

| V | P | RC | PT=SR=203 | length |
|---|---|---|---|---|
| | | SSRC | | |
| | | ... | | |
| Length | | | Reason for leaving... | |

Payload Format Change Request

If a FS receives a voice packet with a payload type that it cannot decode, the FS may send a request to the originating FS to change the codec that it is using. If the sender has other receivers already receiving that codec, then it may request a second address from the RFSS and send multiple audio streams. The form of the request lists the preferred codec as well as a list of all supported payload types.

TABLE 17

Payload Format Change Request

| Ver | P | Count | Packet Type | | Length |
|---|---|---|---|---|---|
| | | | SSRC | | |
| Preferred payload type | | | Additional payloads supported... (padded to 32 bit boundary) | | |
| Ver 2 bits | | | Version = 2. Identifies the version of RTP, which is the same in RTCP packets as in RTP data packets. The version defined by this specification is two (2). | | |
| P 1 bit | | | Padding. If the padding bit is set, this RTCP packet contains some additional padding octets at the end which are not part of the control information. The last octet of the padding is a count of how many padding octets should be ignored. Padding may be used by some encryption algorithms with fixed block sizes. In a compound RTCP packet, padding may be used on the last individual packet because the compound packet is encrypted as a whole. | | |

TABLE 17-continued

Payload Format Change Request

| | |
|---|---|
| Count<br>5 bits | Specifies the number of payload types listed |
| Packet Type<br>8 bits | Fixed identifier of this packet type 210 (Proposed) |
| Length<br>16 bits | The length of this RTCP packet in 32-bit words minus one, including the header and any padding. The offset of one makes zero a valid length and avoids a possible infinite loop in scanning a compound RTCP packet, while counting 32-bit words avoids a validity check for a multiple of 4. |
| SSRC<br>32 bits | The synchronization source identifier for the originator of this SR packet. |
| Preferred Payload Type<br>7 bits | The RTP payload type that is being requested by a destination. The source may or may not be able to accommodate this preferred choice. |
| Additional Payload Types<br>7 bits each | A list of 'count' payload types that the SSRC can accommodate. The list may be padded with 0 bits to an even 32 bit boundary. The FS which receives this will look through the list for types that can be provided and will select one based on own internal selection criteria. |

Exemplary Radio System Specific Control Messages

General Message Definitions

Individual radio systems may support multiple over the air (OTA) protocols. Because of this variation, it may be beneficial for the infrastructure to identify the protocol of the packet source so that it can provide the appropriate control information for that protocol. A generic frame may be used for all control messages.

TABLE 18

Radio System Specific Control Message Header

| Ver | Reserved | Packet Type | Length |
|---|---|---|---|
| | | | SSRC |
| | Manufacturer | Protocol | Message Code |
| | | Message data | |

| | |
|---|---|
| Ver<br>2 bits | Version = 2. Identifies the version of RTP, which is the same in RTCP packets as in RTP data packets. The version defined by this specification is two (2). |
| P<br>1 bit | Padding. If the padding bit is set, this RTCP packet contains some additional padding octets at the end which are not part of the control information. The last octet of the padding is a count of how many padding octets should be ignored. Padding may be needed by some encryption algorithms with fixed block sizes. In a compound RTCP packet, padding should only be required on the last individual packet because the compound packet is encrypted as a whole. |
| Reserved<br>5 bits | Unused at this time |
| Packet Type<br>8 bits | Fixed identifier of this packet type 211 (Proposed as Radio System Control) |
| Length<br>16 bits | The length of this RTCP packet in 32-bit words minus one, including the header and any padding. The offset of one makes zero a valid length and avoids a possible infinite loop in scanning a compound RTCP packet, while counting 32-bit words avoids a validity check for a multiple of 4. |
| SSRC<br>32 bits | The synchronization source identifier for the originator of this SR packet. |
| Manufacturer<br>8 bits | 0 for standard packets. May denote custom features as defined in TIA document TSB102.BAAC-A Project 25 Common Air Interface Reserved Values. |
| Protocol<br>8 bits | This number indicates the protocol being used. This defines the format of the remainder of this message.<br>0 Project 25<br>1 LTR ™<br>2 LTR-Net ™<br>3 MultiNet ™<br>4 SmartNet ™/SmartZone ™<br>5 EDACs ™ |

TABLE 18-continued

Radio System Specific Control Message Header

| | |
|---|---|
| Message code 16 bits | Identifies the individual radio system control message. |
| Message Data N 32 bit words | This is the data associated with a particular message for a particular protocol. The definition may vary with each message. |

The following message codes are defined for all protocols where appropriate. Any messages containing message codes that are not supported on a particular protocol are to be accepted and discarded gracefully and a receiver report indicating a zero call length may be sent for the message code.

TABLE 19

Radio System Control Messages

| Message Code | Description |
|---|---|
| 1 | UID Active in Group Voice call |
| 2 | UID Not Authorized on talk group |
| 3 | UID Not Authorized on Site |
| 4 | Individual Voice Call Request |
| 5 | Individual Voice Call Assignment |
| 6 | Individual Voice Call Assignment Response |
| 7 | Individual Voice Call Response |
| 8 | Inter-System Group Call Request |
| 9 | Inter-System Group Call Assignment |
| 10 | Inter-System Group Call Assignment Response |
| 11 | Inter-System Group Call Response |
| 12 | Unaddressed Voice Call Request |
| 13 | Unaddressed Voice Call Assignment |
| 14 | Unaddressed Voice Call Acknowledge |
| 15 | Message Update |
| 16 | Message Update Acknowledge |
| 17 | Request Denied |
| 18 | Channel Status Change |
| 19 | Radio Unit Monitoring Request |
| 20 | Radio Unit Monitoring Order |
| 21 | Radio Unit Monitoring Acknowledge |
| 22 | Radio Unit Monitoring Stop |
| 23 | Radio Unit Monitoring Stopped |
| 24 | Voice Telephone Interconnect - Explicit Dialing |
| 25 | Voice Telephone Interconnect - Implicit Dialing |
| 26 | Voice Telephone Interconnect - PSTN Call |

TABLE 19-continued

Radio System Control Messages

| Message Code | Description |
|---|---|
| 27 | Silent Emergency Listening Request |
| 28 | Silent Emergency Listening Order |
| 29 | Silent Emergency Listening Acknowledge |
| 30 | Silent Emergency Listening Stop |
| 31 | Silent Emergency Listening Stopped |
| 32 | Broadcast Voice Call Request |
| 33 | Broadcast Voice Call Assignment |
| 34 | Broadcast Voice Call Acknowledge |
| 35 | Discreet Listening Request |
| 36 | Discreet Listening Acknowledge |
| 37 | Discreet Listening Active |
| 38 | Discreet Listening Inactive |
| 39 | Discreet Listening Stop |
| 40 | Unit Temporary Disable Request |
| 41 | Unit Temporary Disable Command |
| 42 | Unit Temporary Disable Acknowledge |
| 43 | Unit Re-Enable Request |
| 44 | Unit Re-Enable Command |
| 45 | Unit Re-Enable Acknowledge |
| 46 | Unit Kill Request |
| 47 | Unit Kill Command |
| 48 | Unit Kill Acknowledge |
| 49 | Alpha Numeric Page Request |
| 50 | Alpha Numeric Page Command |
| 51 | Alpha Numeric Page Acknowledge |

Project-25 Protocol Message Definitions

UID Active in Group Voice Call

In one embodiment, when a FS receives a voice packet from the CAI, it immediately starts sending the voice packets to the corresponding multicast address. It also sends a 'UID Active' control packet to the RFSS to verify permissions.

| Ver | P | Reserved | Packet Type | | Length | |
|---|---|---|---|---|---|---|
| | | | | SSRC | | |
| | | Manufacturer | | Protocol | | Message Code |
| | | | WACN | | | System ID |
| | SSID | | | SID | | Talk Group |
| | Service Options | | | | UID | |

| | |
|---|---|
| Control header | See Section B |
| Message code 16 bits | Defined = 1. Identifies the individual radio system control message. |
| WACN 20 bits | Network Identifier. Unique for on interconnected networks. |
| System ID 12 bits | System Identifier. Unique in Network. |
| SSID 8 bits | RFSS ID. Unique in System |
| SID 8 bits | Site ID |
| Talk Group 16 bits | Talk group that the User is active on |
| UID 24 bits | Unit ID assigned to Radio |

| | |
|---|---|
| Service Options 8 bits | Service Options as defined in Project 25 Trunking Control Channel Messages (TIA 102.AABC) |

UID Not Authorized on talk group

In one embodiment, if the RFSS receives a UID Active packet on a talk group and site for which the user is not authorized, it sends a 'UID Not Authorized on talk group' packet back to the FS.

| Ver | P | Reserved | Packet Type | | Length | |
|---|---|---|---|---|---|---|
| | | | SSRC | | | |
| | Manufacturer | | | Protocol | | Message Code |
| | | WACN | | | | System ID |
| | SSID | | | SID | | Talk Group |
| | Service Options | | | UID | | |

| | |
|---|---|
| Control header | See Section B |
| Message code 16 bits | Defined = 2. Identifies the individual radio system control message. |
| WACN 20 bits | Network Identifier. Unique for on interconnected networks. |
| System ID 12 bits | System Identifier. Unique in Network. |
| SSID 8 bits | RFSS ID. Unique in System |
| SID 8 bits | Site ID |
| Talk Group 16 bits | Talk group that the User is not authorized to use. |
| Service Options 8 bits | Service Options as defined in Project 25 Trunking Control Channel Messages (TIA 102.AABC) |
| UID 24 bits | Unit ID assigned to Radio |

UID Not Authorized on Site

In one embodiment, if an RFSS receives a UID Active packet on a site for which the user is not authorized, it sends a 'UID Not Authorized on talk Site' packet back to the FS.

| Ver | P | Reserved | Packet Type | | Length | |
|---|---|---|---|---|---|---|
| | | | SSRC | | | |
| | Manufacturer | | | Protocol | | Message Code |
| | | WACN | | | | System ID |
| | SSID | | | SID | | Reserved |
| | Service Options | | | UID | | |

| | |
|---|---|
| Control header | See Section B |
| Message code 16 bits | Defined = 3. Identifies the individual radio system control message. |
| WACN 20 bits | Network Identifier. Unique for on interconnected networks. |
| System ID 12 bits | System Identifier. Unique in Network. |
| SSID 8 bits | RFSS ID. Unique in System |
| SID 8 bits | Site ID |
| Service Options 8 bits | Service Options as defined in Project 25 Trunking Control Channel Messages (TIA 102.AABC) |
| UID 24 bits | Unit ID assigned to Radio |

Individual Voice Call Request

In one embodiment, upon receipt of the Individual Voice Call Request message, the RFSS will verify permissions and assign a multicast address to the call. This address is sent first to the destination FS in an Individual Voice Call Assignment.

| Ver | P | Reserved | Packet Type | Length |
|---|---|---|---|---|
| | | | SSRC | |
| | Manufacturer | | Protocol | Message Code |
| | | Source WACN | | Source System ID |
| | Service Options | | | Source UID |
| | | Destination WACN | | Destination System ID |
| | Reserved | | | Destination UID |

| | |
|---|---|
| Control header | See Section B |
| Message code 16 bits | Defined = 4. Identifies the individual radio system control message. |
| Source WACN 20 bits | Network Identifier. Unique for all interconnected networks. |
| Service Options 8 bits | Service Options as defined in Project 25 Trunking Control Channel Messages (TIA 102.AABC) |
| Source System ID 12 bits | System Identifier. Unique in Network. |
| Source UID 24 bits | Unit ID assigned to Radio Originating call |
| Destination System ID 12 bits | System Identifier. Unique in Network. |
| Source UID 24 bits | Unit ID assigned to Radio Originating call |
| Destination WACN 20 bits | Network Identifier. Unique for all interconnected networks. |
| Destination System ID 12 bits | System Identifier. Unique in Network. |
| Destination UID 24 bits | Unit ID assigned to destination subscriber unit |

Individual Voice Call Assignment

In one embodiment, upon receipt of the Individual Voice Call Assignment, a FS will register for the multicast address and send a Individual Voice Call Assignment Response.

| Ver | P | Reserved | Packet Type | Length |
|---|---|---|---|---|
| | | | SSRC | |
| | Manufacturer | | Protocol | Message Code |
| | | Source WACN | | Source System ID |
| | Service Options | | | Source UID |
| | | Destination WACN | | Destination System ID |
| | Reserved | | | Destination UID |
| | | | IP Address | |

| | |
|---|---|
| Control header | See Section B |
| Message code 16 bits | Defined = 5. Identifies the individual radio system control message. |
| Source WACN 20 bits | Network Identifier. Unique for all interconnected networks. |
| Source System ID 12 bits | System Identifier. Unique in Network. |
| Service Options 8 bits | Service Options as defined in Project 25 Trunking Control Channel Messages (TIA 102.AABC) |
| Source UID 24 bits | Unit ID assigned to Radio Originating call |
| Destination WACN 20 bits | Network Identifier. Unique for all interconnected networks. |
| Destination System ID 12 bits | System Identifier. Unique in Network. |
| Destination UID 24 bits | Unit ID assigned to destination subscriber unit |
| IP Address 32 bits | IP multicast address on which the call will take place. |

Individual Voice Call Assignment Response

In one embodiment, upon receipt of the Individual Voice Call Assignment Response, the RFSS will send the Individual Voice Call Response to the originating FS.

| Ver | P | Reserved | Packet Type | Length |
|---|---|---|---|---|
| | | | SSRC | |
| | Manufacturer | | Protocol | Message Code |
| | | Source WACN | | Source System ID |
| | Response Code | | | Source UID |
| | | Destination WACN | | Destination System ID |
| | Service Options | | | Destination UID |

| | |
|---|---|
| Control header | See Section B |
| Message code 16 bits | Defined = 6. Identifies the individual radio system control message. |
| Source WACN 20 bits | Network Identifier. Unique for all interconnected networks. |
| Source System ID 12 bits | System Identifier. Unique in Network. |
| Source UID 24 bits | Unit ID assigned to Radio Originating call |
| Destination WACN 20 bits | Network Identifier. Unique for all interconnected networks. |
| Destination System ID 12 bits | System Identifier. Unique in Network. |
| Service Options 8 bits | Service Options as defined in Project 25 Trunking Control Channel Messages (TIA 102.AABC) |
| Destination UID 24 bits | Unit ID assigned to destination subscriber unit |
| Response Code | Response code indicating whether the FS was able to allocate a channel to the call. |

Individual Voice Call Response

In one embodiment, upon receipt of the Individual Voice Call Response, the FS will finalize or drop the call connection based on the response code.

| Ver | P | Reserved | Packet Type | Length |
|---|---|---|---|---|
| | | | SSRC | |
| | Manufacturer | | Protocol | Message Code |
| | | Source WACN | | Source System ID |
| | Response Code | | | Source UID |
| | | Destination WACN | | Destination System ID |
| | Service Options | | | Destination UID |

| | |
|---|---|
| Control header | See Section B |
| Message code 16 bits | Defined = 7. Identifies the individual radio system control message. |
| Source WACN 20 bits | Network Identifier. Unique for all interconnected networks. |
| Source System ID 12 bits | System Identifier. Unique in Network. |
| Source UID 24 bits | Unit ID assigned to Radio Originating call |
| Destination WACN 20 bits | Network Identifier. Unique for all interconnected networks. |
| Destination System ID 12 bits | System Identifier. Unique in Network. |
| Service Options 8 bits | Service Options as defined in Project 25 Trunking Control Channel Messages (TIA 102.AABC) |
| Destination UID 24 bits | Unit ID assigned to destination subscriber unit |
| Response Code | Response code indicating whether the FS was able to allocate a channel to the call. |

Inter-System Group Call Request

In one embodiment, upon receipt of an Inter-System Group Call Request message, the RC will verify permissions and negotiate with the destination System for a multicast address. This address may be sent first to the destination FS in a Inter-System Group Call Assignment.

| Ver | P | Reserved | Packet Type | Length |
|---|---|---|---|---|
| | | | SSRC | |
| | Manufacturer | | Protocol | Message Code |
| | | Source WACN | | Source System ID |
| | Service Options | | | Source UID |
| | | Destination WACN | | Destination System ID |
| | Destination SSID | | Destination SID | Destination Talk Group |

| | |
|---|---|
| Control header | See Section B |
| Message code 16 bits | Defined = 8. Identifies the individual radio system control message. |
| Source WACN 20 bits | Network Identifier. Unique for all interconnected networks. |
| Destination System ID 12 bits | System Identifier. Unique in Network. |
| Service Options 8 bits | Service Options as defined in Project 25 Trunking Control Channel Messages (TIA 102.AABC) |
| Source UID 24 bits | Unit ID assigned to Radio Originating call |
| Destination WACN 20 bits | Network Identifier. Unique for all interconnected networks. |
| Destination System ID 12 bits | System Identifier. Unique in Network. |
| Destination SSID 8 bits | RFSS ID. Unique in System |
| Destination SID 8 bits | Site ID |
| Destination Talk Group 16 bits | Talk group that the User is not authorized to use. |

Inter-System Group Call Assignment

In one embodiment, upon receipt of the Inter-System Group Call Assignment, a FS will register for the multicast address and send a Inter-System Group Call Assignment Response.

| Ver | P | Reserved | Packet Type | Length |
|---|---|---|---|---|
| | | SSRC | | |
| Manufacturer | | Protocol | | Message Code |
| | Source WACN | | | Source System ID |
| Service Options | | | Source UID | |
| | Destination WACN | | | Destination System ID |
| Destination SSID | | Destination SID | | Destination Talk Group |
| | | IP Multicast Address | | |

| | |
|---|---|
| Control header | See Section B |
| Message code 16 bits | Defined = 9. Identifies the individual radio system control message. |
| Source WACN 20 bits | Network Identifier. Unique for all interconnected networks. |
| Source System ID 12 bits | System Identifier. Unique in Network. |
| Service Options 8 bits | Service Options as defined in Project 25 Trunking Control Channel Messages (TIA 102.AABC) |
| Source UID 24 bits | Unit ID assigned to Radio Originating call |
| Destination WACN 20 bits | Network Identifier. Unique for all interconnected networks. |
| Destination System ID 12 bits | System Identifier. Unique in Network. |
| Destination SSID 8 bits | RFSS ID. Unique in System |
| Destination SID 8 bits | Site ID |
| Destination Talk Group 16 bits | Talk group that the User is not authorized to use. |
| IP Multicast Address 32 bits | Multicast address to use for the call. |

Inter-System Group Call Assignment Response

In one embodiment, upon receipt of the Inter-System Group Call Assignment Response, the RFSS will send the Inter-System Group Call Response to the originating FS.

| Ver | P | Reserved | Packet Type | Length |
|---|---|---|---|---|
| | | SSRC | | |
| Manufacturer | | Protocol | | Message Code |
| | Source WACN | | | Source System ID |
| Response Code | | | Source UID | |
| | Destination WACN | | | Destination System ID |
| Destination SSID | | Destination SID | | Destination Talk Group |

| | |
|---|---|
| Control header | See Section B |
| Message code 16 bits | Defined = 10. Identifies the individual radio system control message. |
| Source WACN 20 bits | Network Identifier. Unique for all interconnected networks. |
| Source System ID 12 bits | System Identifier. Unique in Network. |
| Source UID 24 bits | Unit ID assigned to Radio Originating call |
| Destination WACN 20 bits | Network Identifier. Unique for all interconnected networks. |
| Destination System ID 12 bits | System Identifier. Unique in Network. |
| Response Code | Response code indicating whether the FS was able to allocate a channel to the call. |
| Destination SSID 8 bits | RFSS ID. Unique in System |
| Destination SID 8 bits | Site ID |
| Destination Talk Group 16 bits | Talk group that the User is not authorized to use. |

Individual Voice Call Response

In one embodiment, upon receipt of the Individual Voice Call Response, the FS will finalize or drop the call connection based on the response code.

| Ver | P | Reserved | Packet Type | Length |
|---|---|---|---|---|
| | | SSRC | | |
| Manufacturer | | Protocol | | Message Code |
| | Source WACN | | | Source System ID |
| Response Code | | | Source UID | |
| | Destination WACN | | | Destination System ID |
| Destination SSID | | Destination SID | | Destination Talk Group |

| | |
|---|---|
| Control header | See Section B |
| Message code 16 bits | Defined = 11. Identifies the individual radio system control message. |
| Source WACN 20 bits | Network Identifier. Unique for all interconnected networks. |
| Source System ID 12 bits | System Identifier. Unique in Network. |
| Source UID 24 bits | Unit ID assigned to Radio Originating call |
| Destination WACN 20 bits | Network Identifier. Unique for all interconnected networks. |
| Destination System ID 12 bits | System Identifier. Unique in Network. |
| Response Code | Response code indicating whether the FS was able to allocate a channel to the call. |
| Destination SSID 8 bits | RFSS ID. Unique in System |
| Destination SID 8 bits | Site ID |
| Destination Talk Group 16 bits | Talk group that the User is not authorized to use. |

Unaddressed Voice Call Request

In one embodiment, the Unaddressed Voice Call Request is sent from a console or other gateway device to the RFSS. The RFSS assigns a multicast addresses from the range of directed call addresses and informs the FS to send all packets for unaddressed voice calls to that address.

| Ver | P | Reserved | Packet Type | Length |
|---|---|---|---|---|
| | | SSRC | | |
| Manufacturer | | Protocol | | Message Code |
| | WACN | | | System ID |
| SSID | | Reserved | S | Service Options Count |
| SID[1] | | ... | | SID[N] Zero filled |

| | |
|---|---|
| Control header | See Section B |
| Message code 16 bits | Defined = 12. Identifies the individual radio system control message. |
| WACN 20 bits | Network Identifier. Unique for all interconnected networks. |
| System ID 12 bits | System Identifier. Unique in Network. |
| SSID 8 bits | RFSS ID. Unique in System |
| S 1 bit | Send Packets 0 - Don't send voice packets 1 - Send voice packets |
| Service Options 8 bits | Service Options as defined in Project 25 Trunking Control Channel Messages (TIA 102.AABC) |
| Count 8 bits | Number of SIDs following |
| SID 8 bits | Site ID list (sequential octets zero filled to 32 bit boundary) |

Unaddressed Voice Call Assignment

In one embodiment, the Unaddressed Voice Call Assignment is sent from the RFSS to a FS. This may be viewed as a command to send all unaddressed voice calls to a certain multicast address for the use of a console or other gateway device.

| Ver | P | Reserved | Packet Type | Length |
|---|---|---|---|---|
| | | SSRC | | |
| Manufacturer | | Protocol | Message Code | |
| WACN | | | System ID | |
| SSID | | SID | Reserved | S |
| IP Address | | | | |

| | |
|---|---|
| Control header | See Section B |
| Message code<br>16 bits | Defined = 13. Identifies the individual radio system control message. |
| WACN<br>20 bits | Network Identifier. Unique for all interconnected networks. |
| System ID<br>12 bits | System Identifier. Unique in Network. |
| SSID<br>8 bits | RFSS ID. Unique in System |
| SID<br>8 bits | Site ID |
| S<br>1 bit | Send packets<br>0 - Don't send packets<br>1 - Send packets |
| IP Address<br>32 bits | IP Multicast address to send voice packets to |

Unaddressed Voice Call Acknowledge

In one embodiment, the Unaddressed Voice Call Acknowledge is sent from a FS back to the RFSS to indicate that it has accepted and executed the Assignment.

| Ver | P | Reserved | Packet Type | Length |
|---|---|---|---|---|
| | | SSRC | | |
| Manufacturer | | Protocol | Message Code | |
| WACN | | | System ID | |
| SSID | | SID | Reserved | S |
| IP Address | | | | |

| | |
|---|---|
| Control header | See Section B |
| Message code<br>16 bits | Defined = 14. Identifies the individual radio system control message. |
| WACN<br>20 bits | Network Identifier. Unique for all interconnected networks. |
| System ID<br>12 bits | System Identifier. Unique in Network. |
| SSID<br>8 bits | RFSS ID. Unique in System |
| SID<br>8 bits | Site ID |
| S<br>1 bit | Send packets<br>0 - Don't send packets<br>1 - Send packets |

Message Update

In one embodiment, the Message Update is sent from a FS to the RFSS to send a Preprogrammed message request to a specified MR (mobile radio).

| Ver | P | Reserved | Packet Type | Length |
|---|---|---|---|---|
| | | SSRC | | |
| Manufacturer | | Protocol | Message Code | |
| WACN | | | System ID | |
| Source UID | | | Service Options | |
| Destination UID | | | Reserved | |
| Message Number | | Reserved | | |

| | |
|---|---|
| Control header | See Section B |
| Message code | Defined = 15. Identifies the individual radio system control message. |
| 16 bits | |
| WACN<br>20 bits | Network Identifier. Unique for all interconnected networks. |
| System ID<br>12 bits | System Identifier. Unique in Network. |
| SSID<br>8 bits | RFSS ID. Unique in System |
| SID<br>8 bits | Site ID |
| Source UID<br>24 bits | Unit ID assigned to Radio Originating call |
| Service Options<br>8 bits | Service Options as defined in Project 25 Trunking Control Channel Messages (TIA 102.AABC) |
| Destination UID<br>24 bits | Unit ID assigned to destination subscriber unit |
| Message Number<br>16 bits | Message Number per Project 25 CAI |

Message Update Acknowledge

In one embodiment, Message Update Acknowledge is sent back to the originator of a Preprogrammed Message Request.

| Ver | P | Reserved | Packet Type | Length |
|---|---|---|---|---|
| | | SSRC | | |
| Manufacturer | | Protocol | Message Code | |
| WACN | | | System ID | |
| Source UID | | | Dest. UID (bits 16-19) | |
| Destination UID<br>(bits 0-15) | | | Message Number | |

| | |
|---|---|
| Control header | See Section B |
| Message code<br>16 bits | Defined = 16. Identifies the individual radio system control message. |
| WACN<br>20 bits | Network Identifier. Unique for all interconnected networks. |
| System ID<br>12 bits | System Identifier. Unique in Network. |
| SSID<br>8 bits | RFSS ID. Unique in System |
| SID<br>8 bits | Site ID |
| Source UID<br>24 bits | Unit ID assigned to Radio Originating call |
| Destination UID<br>24 bits | Unit ID assigned to destination subscriber unit |
| Message Number<br>16 bits | Message Number per Project 25 CAI |

Request Denied

In one embodiment, Request Denied is sent from the RFSS back to the message source indicating that the action requested by the message cannot be completed.

| Ver | P | Reserved | Packet Type | Length |
|---|---|---|---|---|
| | | SSRC | | |
| Manufacturer | | Protocol | Message Code | |
| Response Code | | | Reserved | |

| | |
|---|---|
| Control header | See Section B |
| Message code<br>16 bits | Defined = 17. Identifies the individual radio system control message. |
| Response Code | Reason for denial. |

Channel Status Change

In one embodiment, this message is sent by a FS to the RFSS each time its status changes.

| Ver | P | Reserved | Packet Type | Length |
|---|---|---|---|---|
| | | | SSRC | |
| | Manufacturer | | Protocol | Message Code |
| | Status Code | | | Reserved |

| | |
|---|---|
| Control header | See Section B |
| Message code 16 bits | Defined = 18. Identifies the individual radio system control message. |
| Status Code | Current status of the FS.<br>0 - Channel status is unknown, use for talk-around<br>1 - Inbound channel is busy<br>2 - Channel status is unknown, use for inbound or outbound<br>3 - Inbound channel is idle |

Radio Unit Monitoring Request

In one embodiment, a Radio Unit Monitoring Request is sent from a FS to the RFSS to request a specified MR open its audio without indication to the end user.

| Ver | P | Reserved | Packet Type | Length |
|---|---|---|---|---|
| | | | SSRC | |
| | Manufacturer | | Protocol | Message Code |
| | | WACN | | System ID |
| | | UID | | Service Options |

| | |
|---|---|
| Control header | See Section B |
| Message code 16 bits | Defined = 19. Identifies the individual radio system control message. |
| WACN 20 bits | Network Identifier. Unique for all interconnected networks. |
| System ID 12 bits | System Identifier. Unique in Network. |
| UID 24 bits | Unit ID assigned to Radio Originating call |
| Service Options 8 bits | Service Options as defined in Project 25 Trunking Control Channel Messages (TIA 102.AABC) |

Radio Unit Monitoring Order

In one embodiment, a Radio Unit Monitoring Order is sent from the RFSS to a FS.

| Ver | P | Reserved | Packet Type | Length |
|---|---|---|---|---|
| | | | SSRC | |
| | Manufacturer | | Protocol | Message Code |
| | | WACN | | System ID |
| | | UID | | Service Options |
| | | IP Address | | |

| | |
|---|---|
| Control header | See Section B |
| Message code 16 bits | Defined = 20. Identifies the individual radio system control message. |
| WACN 20 bits | Network Identifier. Unique for all interconnected networks. |
| System ID 12 bits | System Identifier. Unique in Network. |
| Service Options 8 bits | Service Options as defined in Project 25 Trunking Control Channel Messages (TIA 102.AABC) |
| IP Address 32 bits | Multicast address to use |

Radio Unit Monitoring Acknowledge

In one embodiment, a Radio Unit Monitoring Acknowledge is sent back to the requestor to indicate that the audio is being sent on the specified multicast address.

| Ver | P | Reserved | Packet Type | Length |
|---|---|---|---|---|
| | | | SSRC | |
| | Manufacturer | | Protocol | Message Code |
| | | WACN | | System ID |
| | | UID | | Service Options |
| | | IP Address | | |

| | |
|---|---|
| Control header | See Section B |
| Message code 16 bits | Defined = 21. Identifies the individual radio system control message. |
| WACN 20 bits | Network Identifier. Unique for all interconnected networks. |
| SID 8 bits | Site ID |
| UID 24 bits | Unit ID assigned to Radio Originating call |
| Service Options 8 bits | Service Options as defined in Project 25 Trunking Control Channel Messages (TIA 102.AABC) |
| IP Address 32 bits | Multicast address to use |

Radio Unit Monitoring Stop

In one embodiment, a Radio Unit Monitoring Stop is sent to indicate that the requester is no longer listening to the audio being sent on the specified multicast address.

| Ver | P | Reserved | Packet Type | Length |
|---|---|---|---|---|
| | | | SSRC | |
| | Manufacturer | | Protocol | Message Code |
| | | WACN | | System ID |
| | | UID | | Service Options |
| | | IP Address | | |

| | |
|---|---|
| Control header | See Section B |
| Message code 16 bits | Defined = 22. Identifies the individual radio system control message. |
| WACN 20 bits | Network Identifier. Unique for all interconnected networks. |
| System ID 12 bits | System Identifier. Unique in Network. |
| UID 24 bits | Unit ID assigned to Radio Originating call |
| Service Options 8 bits | Service Options as defined in Project 25 Trunking Control Channel Messages (TIA 102.AABC) |
| IP Address 32 bits | Multicast address to use |

Radio Unit Monitoring Stopped

In one embodiment, a Radio Unit Monitoring Stopped is sent to the RFSS to indicate that the specified multicast address is no longer in use.

| Ver | P | Reserved | Packet Type | Length |
|---|---|---|---|---|
| | | | SSRC | |
| | Manufacturer | | Protocol | Message Code |
| | | WACN | | System ID |
| | | UID | | Service Options |
| | | IP Address | | |

| | |
|---|---|
| Control header | See Section B |
| Message code 16 bits | Defined = 23. Identifies the individual radio system control message. |
| WACN 20 bits | Network Identifier. Unique for all interconnected networks. |
| System ID 12 bits | System Identifier. Unique in Network. |
| UID 24 bits | Unit ID assigned to Radio Originating call |
| Service Options 8 bits | Service Options as defined in Project 25 Trunking Control Channel Messages (TIA 102.AABC) |

| | |
|---|---|
| IP Address | Multicast address to use |
| 32 bits | |

Voice Telephone Interconnect—Explicit Dialing

In one embodiment, a Voice Telephone Interconnect Explicit Dialing Request is sent from a FS to the RFSS for authorization.

| Ver | P | Reserved | Packet Type | Length |
|---|---|---|---|---|
| | | SSRC | | |
| Manufacturer | | | Protocol | Message Code |
| | WACN | | | System ID |
| | UID | | | Service Options |
| Count | | Digit 1 | ... | Digit N |

| | |
|---|---|
| Control header | See Section B |
| Message code<br>16 bits | Defined = 24. Identifies the individual radio system control message. |
| WACN<br>20 bits | Network Identifier. Unique for all interconnected networks. |
| System ID<br>12 bits | System Identifier. Unique in Network. |
| UID<br>24 bits | Unit ID assigned to Radio Originating call |
| Service Options<br>8 bits | Service Options as defined in Project 25 Trunking Control Channel Messages (TIA 102.AABC) |
| Count<br>8 bits | Number of digits that follow |
| Digit 1 ... N<br>8 bits each | ASCII representation of the digits dialed by the user. Zero padded out to an even 32-bit boundary. |

Voice Telephone Interconnect—Implicit Dialing

In one embodiment, a Voice Telephone Interconnect Implicit Dialing Request is sent from a FS to the RFSS for authorization.

| Ver | P | Reserved | Packet Type | Length |
|---|---|---|---|---|
| | | SSRC | | |
| Manufacturer | | | Protocol | Message Code |
| | WACN | | | System ID |
| | UID | | | Service Options |
| PSTN Address | | | Reserved | |

| | |
|---|---|
| Control header | See Section B |
| Message code<br>16 bits | Defined = 25. Identifies the individual radio system control message. |
| WACN<br>20 bits | Network Identifier. Unique for all interconnected networks. |
| System ID<br>12 bits | System Identifier. Unique in Network. |
| UID<br>24 bits | Unit ID assigned to Radio Originating call |
| Service Options<br>8 bits | Service Options as defined in Project 25 Trunking Control Channel Messages (TIA 102.AABC) |
| PSTN Address<br>8 bits | PSTN speed dial code |

Voice Telephone Interconnect—PSTN Call

In one embodiment, a Voice Telephone Interconnect PSTN Call Request is sent from the RFSS to a FS.

| Ver | P | Reserved | Packet Type | Length |
|---|---|---|---|---|
| | | SSRC | | |
| Manufacturer | | | Protocol | Message Code |
| | WACN | | | System ID |
| | UID | | | Service Options |
| Parameter Type | | Parameter Length | Data 1 | Data 2... |

| | |
|---|---|
| Control header | See Section B |
| Message code<br>16 bits | Defined = 26. Identifies the individual radio system control message. |
| WACN<br>20 bits | Network Identifier. Unique for all interconnected networks. |
| System ID<br>12 bits | System Identifier. Unique in Network. |
| UID<br>24 bits | Unit ID assigned to Radio Originating call |
| Service Options<br>8 bits | Service Options as defined in Project 25 Trunking Control<br>Channel Messages (TIA 102.AABC) |
| Parameter Type<br>8 bits | Caller ID parameter type (See Belcore specs for CNAM MDMF)<br>Examples:<br>Date<br>Phone Number<br>4 Reason number not available<br>7 Name<br>8 Reason name not available |
| Parameter Length<br>8 bits | Number of ASCII characters in parameter |
| Data 1 ... N | ASCII characters of the parameter. Zero padded to 32-bit boundary. |

Silent Emergency Listening Request

In one embodiment, a Silent Emergency Listening Request is sent from a gateway to the RFSS to request all silent emergency calls be directed to it.

| Ver | P | Reserved | Packet Type | Length |
|---|---|---|---|---|
| | | SSRC | | |
| Manufacturer | | | Protocol | Message Code |
| | System ID | | Reserved | SSID | SID |
| | | Reserved | | Service Options |

| | |
|---|---|
| Control header | See Section B |
| Message code<br>16 bits | Defined = 27. Identifies the individual radio system control message. |
| WACN<br>20 bits | Network Identifier. Unique for all interconnected networks. |
| System ID<br>12 bits | System Identifier. Unique in Network. |
| SSID<br>8 bits | RFSS ID. Unique in System |
| SID<br>8 bits | Site ID |
| Service Options<br>8 bits | Service Options as defined in Project 25 Trunking Control Channel Messages (TIA 102.AABC) |

Silent Emergency Listening Order

In one embodiment, a Silent Emergency Listening Order is sent from the RFSS to FS.

| Ver | P | Reserved | Packet Type | Length |
|-----|---|----------|-------------|--------|
| | | | SSRC | |
| Manufacturer | | | Protocol | Message Code |
| | System ID | | Reserved SSID | SID |
| | Reserved | | | Service Options |
| | | IP Address | | |

| | |
|---|---|
| Control header | See Section B |
| Message code 16 bits | Defined = 28. Identifies the individual radio system control message. |
| WACN 20 bits | Network Identifier. Unique for all interconnected networks. |
| System ID 12 bits | System Identifier. Unique in Network. |
| SSID 8 bits | RFSS ID. Unique in System |
| SID 8 bits | Site ID |
| Service Options 8 bits | Service Options as defined in Project 25 Trunking Control Channel Messages (TIA 102.AABC) |
| IP Address 32 bits | Multicast address to use |

Silent Emergency Listening Acknowledge

In one embodiment, a Silent Emergency Listening Acknowledge is sent back to the requestor to indicate that the audio is being sent on the specified multicast address.

| Ver | P | Reserved | Packet Type | Length |
|-----|---|----------|-------------|--------|
| | | | SSRC | |
| Manufacturer | | | Protocol | Message Code |
| | System ID | | Reserved SSID | SID |
| | Reserved | | | Service Options |
| | | IP Address | | |

| | |
|---|---|
| Control header | See Section B |
| Message code 16 bits | Defined = 29. Identifies the individual radio system control message. |
| WACN 20 bits | Network Identifier. Unique for all interconnected networks. |
| System ID 12 bits | System Identifier. Unique in Network. |
| SSID 8 bits | RFSS ID. Unique in System |
| SID 8 bits | Site ID |
| Service Options 8 bits | Service Options as defined in Project 25 Trunking Control Channel Messages (TIA 102.AABC) |
| IP Address 32 bits | Multicast address to use |

Silent Emergency Listening Stop

In one embodiment, a Silent Emergency Listening Stop is sent to indicate that the requestor is no longer listening to the audio being sent on the specified multicast address.

| Ver | P | Reserved | Packet Type | Length |
|-----|---|----------|-------------|--------|
| | | | SSRC | |
| Manufacturer | | | Protocol | Message Code |
| | System ID | | Reserved SSID | SID |
| | Reserved | | | Service Options |
| | | IP Address | | |

| | |
|---|---|
| Control header | See Section B |
| Message code 16 bits | Defined = 29. Identifies the individual radio system control message. |
| WACN 20 bits | Network Identifier. Unique for all interconnected networks. |
| System ID 12 bits | System Identifier. Unique in Network. |
| SSID 8 bits | RFSS ID. Unique in System |
| SID 8 bits | Site ID |
| Service Options 8 bits | Service Options as defined in Project 25 Trunking Control Channel Messages (TIA 102.AABC) |
| IP Address 32 bits | Multicast address to use |

Silent Emergency Listening Stopped

In one embodiment, a Silent Emergency Listening Stopped is sent to the RFSS to indicate that the specified multicast address is no longer in use.

| Ver | P | Reserved | Packet Type | Length |
|-----|---|----------|-------------|--------|
| | | | SSRC | |
| Manufacturer | | | Protocol | Message Code |
| | System ID | | Reserved SSID | SID |
| | Reserved | | | Service Options |
| | | IP Address | | |

| | |
|---|---|
| Control header | See Section B |
| Message code 16 bits | Defined = 29. Identifies the individual radio system control message. |
| WACN 20 bits | Network Identifier. Unique for all interconnected networks. |
| System ID 12 bits | System Identifier. Unique in Network. |
| SSID 8 bits | RFSS ID. Unique in System |
| SID 8 bits | Site ID |
| Service Options 8 bits | Service Options as defined in Project 25 Trunking Control Channel Messages (TIA 102.AABC) |
| IP Address 32 bits | Multicast address to use |

Broadcast Voice Call Request

In one embodiment, a Broadcast Voice Call Request is sent from a console or other gateway device to an RFSS. The RFSS assigns a multicast addresses from the range of directed call addresses and informs the FS to send all packets for Broadcast voice calls to that address.

| Ver | P | Reserved | Packet Type | Length |
|-----|---|----------|-------------|--------|
| | | | SSRC | |
| Manufacturer | | | Protocol | Message Code |
| | WACN | | | System ID |
| SSID | | Reserved | S | Service Options Count |
| SID[1] | | ... | | SID[N] Zero filled |

| | |
|---|---|
| Control header | See Section B |
| Message code 16 bits | Defined = 32. Identifies the individual radio system control message. |
| WACN 20 bits | Network Identifier. Unique for all interconnected networks. |
| System ID 12 bits | System Identifier. Unique in Network. |
| SSID 8 bits | RFSS ID. Unique in System |
| S 1 bit | Send Packets 0 - Don't send voice packets 1 - Send voice packets |
| Service Options 8 bits | Service Options as defined in Project 25 Trunking Control Channel Messages (TIA 102.AABC) |

-continued

| | |
|---|---|
| Count | Number of SIDs following |
| 8 bits | |
| SID | Site ID list (sequential octets zero filled to 32 bit |
| 8 bits | boundary) |

Broadcast Voice Call Assignment

In one embodiment, a Broadcast Voice Call Assignment is sent from RFSS to an FS. This may be viewed as a command to send all Broadcast voice calls to a certain multicast address for the use of a console or other gateway device.

| Ver | P | Reserved | Packet Type | Length |
|---|---|---|---|---|
| | | SSRC | | |
| | Manufacturer | | Protocol | Message Code |
| | WACN | | | System ID |
| SSID | | SID | | Reserved S |
| | | IP Address | | |

| | |
|---|---|
| Control header | See Section B |
| Message code | Defined = 33. Identifies the individual radio system |
| 16 bits | control message. |
| WACN | Network Identifier. Unique for all interconnected |
| 20 bits | networks. |
| System ID | System Identifier. Unique in Network. |
| 12 bits | |
| SSID | RFSS ID. Unique in System |
| 8 bits | |
| SID | Site ID |
| 8 bits | |
| S | Send packets |
| 1 bit | 0 - Don't send packets |
| | 1 - Send packets |
| IP Address | IP Multicast address to send voice packets to |
| 32 bits | |

Broadcast Voice Call Acknowledge

In one embodiment, a Broadcast Voice Call Acknowledge is sent from a FS back to the RFSS to indicate that it has accepted and executed the Assignment.

| Ver | P | Reserved | Packet Type | Length |
|---|---|---|---|---|
| | | SSRC | | |
| | Manufacturer | | Protocol | Message Code |
| | WACN | | | System ID |
| SSID | | SID | | Reserved S |
| | | IP Address | | |

| | |
|---|---|
| Control header | See Section B |
| Message code | Defined = 34. Identifies the individual radio system |
| 16 bits | control message. |
| WACN | Network Identifier. Unique for all interconnected |
| 20 bits | networks. |
| System ID | System Identifier. Unique in Network. |
| 12 bits | |
| SSID | RFSS ID. Unique in System |
| 8 bits | |
| SID | Site ID |
| 8 bits | |
| S | Send packets |
| 1 bit | 0 - Don't send packets |
| | 1 - Send packets |

Discreet Listening Request

In one embodiment, a Discreet Listening Request is sent from a Console to a RFSS to request notification of a specified UID's individual calls.

| Ver | P | Reserved | Packet Type | Length |
|---|---|---|---|---|
| | | SSRC | | |
| | Manufacturer | | Protocol | Message Code |
| | Source WACN | | | Source System ID |
| | Source UID | | | Source Service Options |
| | Destination WACN | | | Destination System ID |
| | Destination UID | | | Dest. Service Options |

| | |
|---|---|
| Control header | See Section B |
| Message code | Defined = 35. Identifies the individual radio system |
| 16 bits | control message. |
| WACN | Network Identifier. Unique for all interconnected |
| 20 bits | networks. |
| System ID | System Identifier. Unique in Network. |
| 12 bits | |
| UID | Unit ID assigned to Radio Originating call |
| 24 bits | |
| Service Options | Service Options as defined in Project 25 Trunking |
| 8 bits | Control Channel Messages (TIA 102.AABC) |

Discreet Listening Acknowledge

In one embodiment, a Discreet Listening Acknowledge is sent from a RFSS back to the console in response to a request that it be notified of a specified UID's individual calls.

| Ver | P | Reserved | Packet Type | Length |
|---|---|---|---|---|
| | | SSRC | | |
| | Manufacturer | | Protocol | Message Code |
| | Source WACN | | | Source System ID |
| | Source UID | | | Source Response Code |
| | Destination WACN | | | Destination System ID |
| | Destination UID | | | Dest. Response Code |

| | |
|---|---|
| Control header | See Section B |
| Message code | Defined = 36. Identifies the individual radio system |
| 16 bits | control message. |
| WACN | Network Identifier. Unique for all interconnected |
| 20 bits | networks. |
| System ID | System Identifier. Unique in Network. |
| 12 bits | |
| UID | Unit ID assigned to Radio Originating call |
| 24 bits | |
| Response Code | Indicates if the UID can be monitored and if not why. |
| 8 bits | |

Discreet Listening Active

In one embodiment, a Discreet Listening Active is sent from a RFSS to a console to indicate a UID is active in a call.

| Ver | P | Reserved | Packet Type | Length |
|---|---|---|---|---|
| | | SSRC | | |
| | Manufacturer | | Protocol | Message Code |
| | WACN | | | System ID |
| | UID | | | Reserved |
| | | IP Address | | |

| | |
|---|---|
| Control header | See Section B |
| Message code | Defined = 37. Identifies the individual radio system |
| 16 bits | control message. |
| WACN | Network Identifier. Unique for all interconnected |
| 20 bits | networks. |
| System ID | System Identifier. Unique in Network. |
| 12 bits | |
| UID | Unit ID assigned to Radio Originating call |
| 24 bits | |
| IP Address | Address call is being carried on. |
| 24 bits | |

Discreet Listening Inactive

In one embodiment, a Discreet Listening Active is sent from a RFSS to a console to indicate a UID call has ended.

| Ver | P | Reserved | Packet Type | Length |
|-----|---|----------|-------------|--------|
| | | SSRC | | |
| Manufacturer | | | Protocol | Message Code |
| | WACN | | | System ID |
| | UID | | | Reserved |
| | | IP Address | | |

| | |
|---|---|
| Control header | See Section B |
| Message code 16 bits | Defined = 38. Identifies the individual radio system control message. |
| WACN 20 bits | Network Identifier. Unique for all interconnected networks. |
| System ID 12 bits | System Identifier. Unique in Network. |
| UID 24 bits | Unit ID assigned to Radio Originating call |
| IP Address 24 bits | Address call is being carried on. |

Discreet Listening Stop

In one embodiment, a Discreet Listening Stop is sent from a Console to a RFSS to request it be no longer be notified of a specified UID's individual calls.

| Ver | P | Reserved | Packet Type | Length |
|-----|---|----------|-------------|--------|
| | | SSRC | | |
| Manufacturer | | | Protocol | Message Code |
| | Source WACN | | | Source System ID |
| | Source UID | | | Source Service Options |
| | Destination WACN | | | Destination System ID |
| | Destination UID | | | Dest. Service Options |

| | |
|---|---|
| Control header | See Section B |
| Message code 16 bits | Defined = 35. Identifies the individual radio system control message. |
| WACN 20 bits | Network Identifier. Unique for all interconnected networks. |
| System ID 12 bits | System Identifier. Unique in Network. |
| UID 24 bits | Unit ID assigned to Radio Originating call |
| Service Options 8 bits | Service Options as defined in Project 25 Trunking Control Channel Messages (TIA 102.AABC) |

Conclusion

Although the present subject matter has been described with reference to the foregoing specific embodiments, many alternatives, variations and modifications will be apparent to those of ordinary skill in the art. For example, the present system enables rapid multicasting on a radio network wherein the transmitting station may be any of a number of members of a particular talk group. In one embodiment, a transmitting station may transmit or receive on multiple talk groups. Thus, the present system permits multicast transmissions, often having brief message content, in multiple directions. The present system also permits rapid changes to the membership of the talk group assignments by changing the mapping between a TGID and a multicast address.

As described herein, the message content may include voice transmissions originating from a land mobile radio. In addition, the message content may include digital data or multimedia data, including video transmissions. For example, a cellular telephone may be adapted to communicate with a talk group including a land mobile radio, a fixed base station, and a computer console in a remote location using a local or wide area network. In one embodiment, a portable computer, such as a laptop or notebook computer, in wired or wireless communication with a cellular telephone, may provide mobile communication with a radio talk group.

These, and other, alternatives, variations and modifications of the present system are intended to fall within the scope of the following appended claims.

What is claimed:

1. A method comprising:
   receiving a multicast address for delivery of a message;
   generating, using one or more processors, a code corresponding to a route for distributing the message using a network; and
   generating a real time transport (RTP) frame that corresponds to the message and the code, wherein the RTP frame includes a plurality of payloads.

2. The method of claim 1 wherein the RTP frame includes multiple encodings of the message.

3. The method of claim 1 wherein the RTP frame includes PCM data and vocoder data for the message.

4. The method of claim 1 wherein the RTP frame includes at least one of management information for the message and channel status information related to the message.

5. The method of claim 1 wherein the RTP frame includes control data for the message.

6. The method of claim 1 wherein receiving the multicast address includes receiving a packet at a server.

7. The method of claim 1 wherein generating the code includes at least one of using Internet Group Management Protocol (IGMP) and using a virtual circuit fiber.

8. The method of claim 1 wherein generating the real time transport frame includes simultaneous analog and digital call handling.

9. The method of claim 1 wherein generating the real time transport frame includes generating time and sequence information.

10. The method of claim 1 further including encoding a link control word with the message.

11. The method of claim 10 wherein encoding the link control word includes using at least one of a talk group identification, a user identification, and a priority code.

12. The method of claim 1 further including encrypting the message.

13. The method of claim 1 wherein generating the real time transport (RTP) frame includes encoding at least one of low speed data, data, voice, and error information.

* * * * *